US006741967B1

United States Patent
Wu et al.

(10) Patent No.: US 6,741,967 B1
(45) Date of Patent: May 25, 2004

(54) FULL SERVICE RESEARCH BUREAU AND TEST CENTER METHOD AND APPARATUS

(75) Inventors: Arthur F. Wu, San Francisco, CA (US); Steven P. Ketchpel, Menlo Park, CA (US)

(73) Assignee: Vividence Corporation, San Mateo, CA (US)

( * ) Notice: Subject to any disclaimer, the term of this patent is extended or adjusted under 35 U.S.C. 154(b) by 0 days.

(21) Appl. No.: 09/277,574

(22) Filed: Mar. 26, 1999

Related U.S. Application Data

(60) Provisional application No. 60/106,737, filed on Nov. 2, 1998.

(51) Int. Cl.[7] .............................................. G06F 17/60
(52) U.S. Cl. ............................... 705/10; 705/11; 705/7; 705/1; 705/500
(58) Field of Search ................... 705/10, 11, 7, 705/1, 500; 709/1, 100, 310, 224, 223, 225, 226; 702/186

(56) References Cited

U.S. PATENT DOCUMENTS

| | | | |
|---|---|---|---|
| 5,627,973 A | 5/1997 | Armstrong et al. | 395/210 |
| 5,675,510 A | 10/1997 | Coffey et al. | 364/514 |
| 5,794,210 A | 8/1998 | Goldhaber et al. | 705/14 |
| 5,796,952 A | 8/1998 | Davis et al. | 395/200 |
| 5,808,908 A * | 9/1998 | Ghahramani | 364/551.01 |
| 5,870,559 A | 2/1999 | Leshem et al. | 395/200.54 |
| 5,893,098 A * | 4/1999 | Peters et al. | 707/10 |
| 5,951,642 A * | 9/1999 | Onoe et al. | 709/224 |
| 5,999,908 A * | 12/1999 | Abelow | 705/1 |
| 6,044,398 A | 3/2000 | Marullo et al. | 709/219 |
| 6,070,145 A * | 5/2000 | Pinsley et al. | 705/10 |

FOREIGN PATENT DOCUMENTS

| | | | |
|---|---|---|---|
| WO | 99/59096 | 11/1999 | G06F/17/60 |

OTHER PUBLICATIONS

Smilowitz et al., "Are we overlooking some usability testing methods? A Comparison of lab, beta, and forum tests." 1994, Behavior & Information Technology.

Fitzgerald et l., "Commercial Product Software Reliability Assessment." 1986.

* cited by examiner

*Primary Examiner*—Tariq R. Hafiz
*Assistant Examiner*—Akiba Robinson-Boyce
(74) *Attorney, Agent, or Firm*—Glenn Patent Group; Michael A. Glenn

(57) ABSTRACT

A centralized full-service research bureau and test center method and apparatus is provided, which assists a customer, typically a Web product manager, in designing a usability test for typical tasks faced by a visitor to the customer's site. The centralized full-service research bureau and test center method and apparatus provides proprietary software to administer the usability test to a pre-qualified pool of testers meeting desired demographic constraints. The usability test measures not only the visitor's success in achieving objectives, but also prompts a tester for context-specific feedback ranging from aesthetics to behavior. Statistics are aggregated across the testing population and presented not just as data, but with recommended actions backed up by analysis.

53 Claims, 12 Drawing Sheets

FULL SERVICE RESEARCH BUREAU AND TEST CENTER METHOD AND APPARATUS

This application claims the benefit of Provisional application Ser. No. 60/106,737, filed Nov. 2, 1998.

BACKGROUND OF THE INVENTION

1. Technical Field

The invention relates to a full-service research bureau and test center. More particularly, the invention relates to a World Wide Web based full-service research bureau and test center.

2. Description of the Prior Art

In the traditional shrinkwrap software world, product usability testing was a business process that was considered nice to have. The software sales cycle relied heavily on product reviews, word-of-mouth, and controlled, static demonstrations (demos). Actual use of a product did not happen until after a user had purchased the product. Costs for customers to switch from a first product to a second product were high, so customer usability was given a low priority.

Today, in the online world, the product is the World Wide Web (Web) site and the Web site is the sales cycle. The usability of a Web site therefore has a direct and critical effect on how much revenue the site can generate. However, usability testing methods have not yet caught up to the requirements of Web site development processes.

Traditional user interface (UI) tests are labor intensive, cost-prohibitive, take ages to run, and yield subjective, non-analytical results at best. Online product competition is now in hyper-drive, and despite multi-million dollar budgets for a typical product launch, Web product managers still do not have an objective, rigorous way of measuring the customer satisfaction and usability of features on their own Web sites. The situation for competitive intelligence is even worse.

The frustration due to the lack of information is summed up by the product manager of a Top 5 Portal Site:

No one in this space knows what they're doing. The most successful people are also the most superstitious about their methods, since with no hard data, they feel their success—however great—has only been based on luck and gut feel so far. Everyone has an opinion, but no one can tell me why any one product is really winning or losing.

Poor understanding of a Web usability and feature quality measurement system is due to a number of factors:

1. The pace of technological advance. In the arms race of new technology, companies' implementation timetables are driven by the competition, not their Information Technology (IT) staff.
2. The multiplicity of functions. Functions for a corporate information Web site are inappropriate for a pre-teen chat room. Designers have to figure out how each function (email, chat, games, shopping, etc.) works best, taking into account the unique audience and objectives of the particular Web site.
3. A flood of raw data but a lack of information. Web logging efforts provide a multitude of traces of user activity. Yet determining what the Web logging data means is impossible because a most important piece, the user's objective, is missing. The most advanced Web site-level tracking methods available focus on whether a marketer's objective, i.e. purchase, registration, ad clicks, etc., was met. The user's objective is ignored. The implication is that a look-to-book ratio twice as good as the industry average might not be cause to celebrate. Perhaps hundreds of willing buyers didn't purchase an item or service because they didn't understand the return policy.
4. Little in-depth testing. Traditional user testing methods, such as for example usability laboratories with one-way mirrors, are expensive, labor intensive, and require long turnaround times. In addition, they provide highly subjective results across an insignificant sample size.

O. Davis and V. Jain, Method and Apparatus for Tracking Client Interaction with a Network Resource and Creating Client Profiles and Resource Database, U.S. Pat. No. 5,796,952 (18 Aug. 1998) discloses a method for monitoring client interaction with a resource downloaded from a server in a computer network. The method comprises the steps of using a client to specify an address of a resource located on a first server and downloading a file corresponding to the resource from the first server in response to specification of the address. The method further comprises the steps of using the client to specify an address of a first executable program located on a second server, the address of the first executable program being embedded in the file downloaded from the first server. The first executable program includes a software timer for monitoring the amount of time the client spends interacting with and displaying the file downloaded from the first server. The method further comprises the step of downloading the first executable program from the second server to run on the client so as to determine the amount of time the client interacts with the file downloaded from the first server. The method further comprises the step of using a server to acquire client identifying indicia from the client, and uploading the amount of time determined by the first executable program to a third server. The first executable program may also monitor time, keyboard events, mouse events, and the like, in order to track choices and selections made by a user in the file. It may execute upon the occurrence of a predetermined event, as well as monitor or determine the amount of information downloaded by the client. The monitored information and client identifying indicia is stored on a database in a server for use in analysis and for automatically serving out files assembled according to user interests and preferences.

While an objective of the Davis teachings is to provide means for -creating a database of user profiles containing details of individual user interaction with and use of network resources and of the amount of time spent by users interacting with and/or using particular resources, as well as details of choices created by individual users within a particular resource, Davis does not disclose nor suggests a usability test or pre-qualified testers. Davis does not disclose nor suggest that a customer take part in the design phase of a usability test to accomplish a set of customer objectives, which take into account a user's objectives.

S. R. Coffey, D. B. Pinsley, and K. A. Poloniewicz, Computer Use Meter and Analyzer, U.S. Pat. No. 5,675,510 (07 Oct. 1997) discloses a system that measures and reports the use of a personal computer by a user through a log file. The log file includes entries corresponding to predetermined events and can report on the applications used and communication functions engaged in by the user. The log files from one or more computers may be assembled and analyzed in order to ascertain computer use habits for computer software, computer hardware and computer communications. The system may also be used to predict computer use trends and to represent computer use history.

The monitoring system of Coffey, et al., provides traces of what users choose, but the disclosure does not teach nor suggest why a users navigate down particular paths. Coffey, et al., discloses that their system collects child Window information for commercial online service providers and user applications. Window titles of these applications' child Windows generally hold useful descriptions of the activity at that moment. For example, if a subscriber is using a mail system for a service, then the Window title so indicates. The system records those titles in a log file.

Coffey, et al., further discloses that online marketers try to understand the characteristics of Web traffic and how much time users spend at different sites. Traffic statistics become fundamental inputs for media planning, in a fashion analogous to using TV ratings as a basis for buying or pricing commercial time. However, Coffey, et al. does not disclose nor suggest that users' objectives be considered in any process of the system.

A. N. Goldhaber and G. Fitts, Attention Brokerage, U.S. Pat. No. 5,794,210 (11 Aug. 1998) discloses a system that provides for the immediate payment to computer and other users for paying attention to an advertisement or other negatively priced information distributed over a computer network such as the Internet. It is the business of brokering the buying and selling of the attention of users. A further disclosure allows advertisers to detach their messages from program content and explicitly target their audience. A special icon or other symbol displayed on a computer screen may represent compensation and allow users to choose whether they view an ad or other negatively priced information and receive associated compensation. Targeting users may be provided by reference to a database of digitally stored demographic profiles of potential users. Information is routed to users based on demographics, and software agents can be used to actively seek out users on a digital network. Private profiles are maintained for different users and user information is released to advertisers and other marketers only based on user permission. Users may be compensated for allowing their information to be released. Competing advertisers may bid for the attention of users using automatic electronic systems, e.g. an auction protocol and these concepts can be generalized to provide an electronic trading house where buyers and sellers can actively find each other and negotiate transactions.

While Goldhaber et al. discloses its four basic principles are attention, interest, sponsorship, and privacy, it gains knowledge about the behavior of users through estimates of past behavior. That is, Goldhaber et al. discloses a mechanism by which advertisers actively compete by bidding for a viewer's attention, wherein the bids are based, in part, on estimates of the viewer's interest and likelihood to buy. The estimates are derived from access to the viewer's electronic profiles detailing preferences and past consuming behavior. Goldhaber et al. does not disclose nor suggest a mechanism for learning from a viewer why a viewer chooses particular actions.

Goldhaber et al. discloses demographic profiles constructed through interest questionnaires that a customer completes when subscribing to the disclosed service and also through electronic tracking of the customer's usage of the service (and other habits). The profiles are dynamic and evolve with the customer's transaction history. A customer can choose to exclude any transaction (e.g. viewing of certain material or purchasing of certain products) from his profile. The profile is also interactive in that a customer edits the profile at any time to add or delete interest features and to delete any transaction records. Goldhaber et al. does not disclose nor suggest a testing mechanism to measure a customer's success in achieving the customer's objectives.

Nor does Goldhaber et al. disclose or suggest prompting for context-specific feedback ranging from the aesthetics of the design to the reason a page request is terminated. Furthermore, Goldhaber et al. does not disclose nor suggest aggregating statistics across a testing population and presenting the testing results with recommended actions backed up by analysis.

It would be advantageous to provide a method and apparatus that provides Web product managers with quick and detailed feedback on customer satisfaction of their own and competitive products across a large sample size using efficient techniques.

It would be advantageous to provide a method and apparatus that provides a usability test for typical tasks faced by a customer to a Web product manager's site. The test measures a customer's success in achieving the customer's objectives and also prompts for context-specific feedback ranging from the aesthetics of the Web page design to the reason a page request is terminated.

It would be advantageous to provide a method and apparatus that aggregates statistics across a testing population and presents data with recommended actions backed up by analysis.

SUMMARY OF THE INVENTION

The invention herein is a method and apparatus that provides, in a preferred embodiment, Web product managers with quick and detailed feedback on a visitor's satisfaction of the Web product managers' own and competitive products. The invention herein in a preferred embodiment provides an end-to-end, automated solution for testing the Usability and Feature Quality™ of any Web site. Unlike other usability and product testing solutions, the invention herein quickly generates highly specific, quantitative results across a large sample size using labor and time efficient techniques.

Specifically, the invention herein aids a customer, which in a preferred embodiment is a Web product manager, in designing a usability test for typical tasks faced by a visitor to the customer's site. The invention uses proprietary software, which in one embodiment comprises enhancements to a tester's Web browser, to administer the usability test to a pre-qualified pool of testers meeting desired demographic constraints. The usability tests measure a visitor's success in achieving the visitor's objectives and also prompt for context-specific feedback ranging from the aesthetics of the design of the customer's site to a reason why a page request was terminated. Statistics are aggregated across the testing population and are presented as data with recommended actions backed up by analysis.

DETAILED DESCRIPTION OF THE INVENTION

Figure 1:
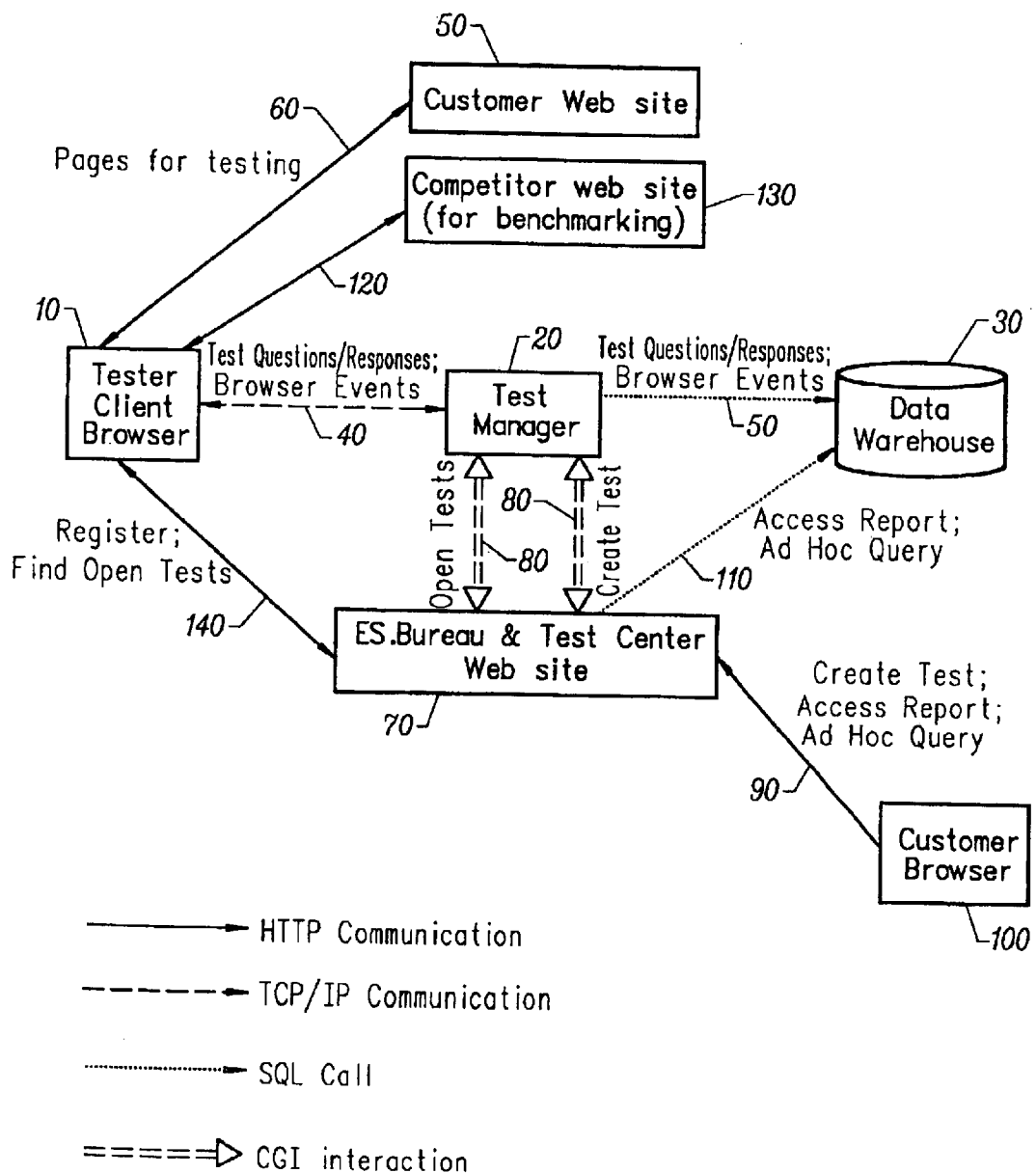
FIG. 1 is a schematic diagram showing the relationship of objects according to the invention.

The invention herein is a method and apparatus that provides, in a preferred embodiment, Web product managers with quick and detailed feedback on a visitor's satisfaction of the Web product managers' own and competitive products. The invention herein, in a preferred embodiment, provides an end-to-end, automated solution for testing the Usability and Feature Quality™ of any Web site. Unlike other usability and product testing solutions, the invention herein quickly generates highly specific, quantitative results across a large sample size using labor and time efficient techniques.

Benefits of the invention comprise, but are not limited to speed, competitive benchmarking, better information, better statistical validity, and lower cost.

The speed in increased because customers get insights from hundreds of user testing sessions in less time than it takes to schedule a handful of test subjects for local testing sessions.

According to an embodiment of the invention, a Web product manager competitively benchmarks a product against its primary competitors. An advantage of the invention is a Web product manager can competitively benchmark as part of an iterative design process, thereby effectively guaranteeing the success of the product.

Better information is provided because a Web product manager learns why an action occurred rather than only what action occurred. For example with a traditional usability test, a Web product manager learns that two testers found a site too slow. According to the invention, the Web product manager learns in addition that 14% of page requests were stopped during transmission and 75% of those were stopped because they took too long to load.

Better statistical validity is provided because the invention is adapted to allow for a large sample size of testers. The customer therefore gains more confidence in the test results and conclusions.

Retaining a tester according to the invention is one-fifth the cost of retaining a tester in a traditional environment. In one example, retaining a tester according to the invention is $250 whereas retaining a tester in a traditional environment is $1250. According to a preferred embodiment of the invention additional reduction in cost is set forth therein because of soft costs, such as, for example, faster turnaround time, lower downtime for the development team, less hassle and higher quality results.

A Usability and Feature Quality™ testing solution is provided to customers using a centralized, Web-based service bureau model. Advantages to customers using the centralized Web-based service, alternatively to selling a software system to each customer to run on the customer's own tester network, comprise but are not limited to ease of adoption, maintenance, tester recruiting, and billing.

Ease of adoption is provided because no server software is required for customers to install, learn or maintain.

Ease of maintenance is provided because the server software need not run on a myriad of platforms.

A preferred embodiment of the invention is adapted to improve tester recruiting. The invention is adapted to accommodate a large tester population from which to build precisely designed test panels for each test. In addition, the invention is adapted to provide a central location for all participating testers to access tests. The invention is adapted to sponsor tests anonymously, rendering a mechanism useful for competitive benchmarking.

A central billing and payment center for customers and testers to clear transactions is provided.

Further advantages to a preferred embodiment of the invention comprise, but are not limited to, sales cycle, support cost, installed base, return on investments (ROI), and customer satisfaction. These further advantages of the invention comprise, for example:

Central billing and evaluation cycles and sales cycles are shorter than in a traditional development and testing environment.

Support costs are lower because only one installation, as opposed to several different installations of software needs to be maintained.

An installed base is provided. Specifically, central control and registry of tester population, tester data and test history is provided.

An improved rate of return (ROI) is provided because a single investment in the central platform is amortized across industry report revenues and network test revenues.

A preferred embodiment of the invention is adapted to monitor more easily customer usage of products and services, which are provided by the invention. For example, the invention is adapted to make linking sales compensation to actual customer usage easier, in contrast to linking sales compensation to license revenue, which often ignores post-sale customer satisfaction.

FIG. 1 is a schematic diagram showing the relationship of objects according to a preferred embodiment of the invention. FIG. 1 shows three core components of preferred embodiment of a Web-based platform of a full-service research bureau and test center. The three core components are a first proprietary software, a second proprietary software, and a storing and retrieval means. In the preferred embodiment, the first proprietary software is a Tester Client Browser 10, the second proprietary software is a Test Manager server 20, and the storing and retrieval means is a Data Warehouse 30. FIG. 1 shows a TCP/IP communication path 40 between the Tester Client Browser. 10 and the Test Manager 20. Typically, test questions and responses, browser events, comments and any other relevant information are transmitted through the TCP/IP communication 40.

Typically, the Tester Client Browser 10 is a modified browser, downloaded and installed on testers' personal machines. In addition to standard navigation and HTML display functions, the browser 10 is adapted to collect browser events 40, such as, for example, submission or fulfillment of a page request; usage of back, forward, or stop buttons; page scrolling and mouse-overs. The browser events 40 are transmitted in a log form to the Test Manager 20. The browser 10 is modified also to pose questions 40 depending upon browser events or messages from the Test Manager 20. Responses 40 to the questions are sent to the Test Manager 20. Additional buttons are provided on the browser 10 that use easily to comment upon a page. Comments 40 are also transmitted to the Test Manager 20.

FIG. 1 shows the Tester Client Browser 10 linked to a Customer Web site 50 through an HTTP Communication path, whereby a customer Web page is loaded directly from a hosting server, with no additional HTML added to the page. Therefore, the Web page is displayed with the identical appearance and latency as viewed from an unmodified browser.

Typically, the Test Manager 20 is a server application simultaneously supporting a multiple of test sessions with a multiple of clients or testers. Herein, the terms 'clients' and 'testers' are interchangeable and refer to the same entity. Each test session presents the customer's objectives to a tester as a series of questions. Additional questions may be triggered as the result of specific answers to earlier questions. The data from a completed test are transmitted to a Data Warehouse 30 through Structured Query Language (SQL) communication 50. Data from the completed test typically comprises, but is not limited to, test questions and responses, browser events and comments. The data 50 is thus stored in the Data Warehouse 30.

Typically, the Data Warehouse 30 stores each logged event from the test session for future analysis. The entries transmitted in an SQL call 50, such as question responses, comments, and significant browser events, are tagged with a test sequence identifier, and a tester identifier (ID). Online analytical processing (OLAP) queries against fact tables in the Data Warehouse 30 permit complex queries. An example of a complex query is a query that represents behavior of a test group on particular questions or combinations of questions, broken down according to demographic or test-specific properties.

FIG. 1 shows a preferred embodiment of a full-service bureau and test center Web site 70. The Web site 70 is linked to the Test Manager server 20 through Common Gateway Interface (CGI) interaction 80. The Web site is a central presence for interaction among the Test Manager 20, customers, and testers. Primary purposes of the Web site 70, include, but are not limited to:

educating customers about benefits of usability testing;

educating testers about benefits of testing and current opportunities;

enrolling testers including, for example, gathering contact information and demographic information;

providing access to customers for pre-generated reports, ad hoc reports, and a test builder application;

providing information relevant to stakeholders and potential employees;

creating communities among testers and customers; and handling electronic commerce (e-commerce) transactions to sell tests and pay testers.

FIG. 1 also shows an HTTP communication path 90 between the Web site 70 and a Customer Browser 100. Through the HTTP communication path 90 and the CGI communication path 80, the customer has access to a Web application on the Web site 70, referred to as Test Builder, with which to create and initiate a usability test automatically. Test Builder allows the specification of number of testers, desired demographics, objectives and other questions.

In another embodiment of the invention, through the HTTP communication 90 the customer has access on the Web site 70 to a Web application, referred to as Ad Hoc Reporter. With Ad Hoc Reporter, the customer, from the Customer Browser 100, poses queries and by an SQL Call 110 about test results against the Data Warehouse 30. In another embodiment, a tool is provided which permits interactive interpretive activities, such as, for example, generating graphs and statistical processing.

In another embodiment of the invention, a support tool, referred to as Report Builder, is provided. Report Builder runs locally on either the Web site 70 or the Test Manager 20 by specialists to facilitate extracting meaningful insights from the test data. An early version of the tool performs a suite of statistical processing and graph generation. A later version of Report Builder assists in highlighting the most relevant quotes and statistics, moving towards increasingly automated generation of personalized reports.

In another embodiment of the invention, a utility, referred to as Test Auditor, is provided as an add-on utility to Test Manager 20. Test Auditor assures data quality. It uses heuristic evaluations to ensure that testers are making good faith efforts to meet objectives and are devoting adequate attention to tasks. In another embodiment, Test Auditor offers bonuses, such as a better rate of payment for completing tests, to testers who provide high quality feedback.

FIG. 1 shows an HTTP communication path 120 between the Tester Client Browser 10 and a Competitor Web site 130 used in competitive benchmarking. Also shown in FIG. 1 is an HTTP communication path 140 between the Tester Client Browser 10 and the Web site 70 used in a tester registration stage and finding available or open tests on the Web site 70.

Figure 2:
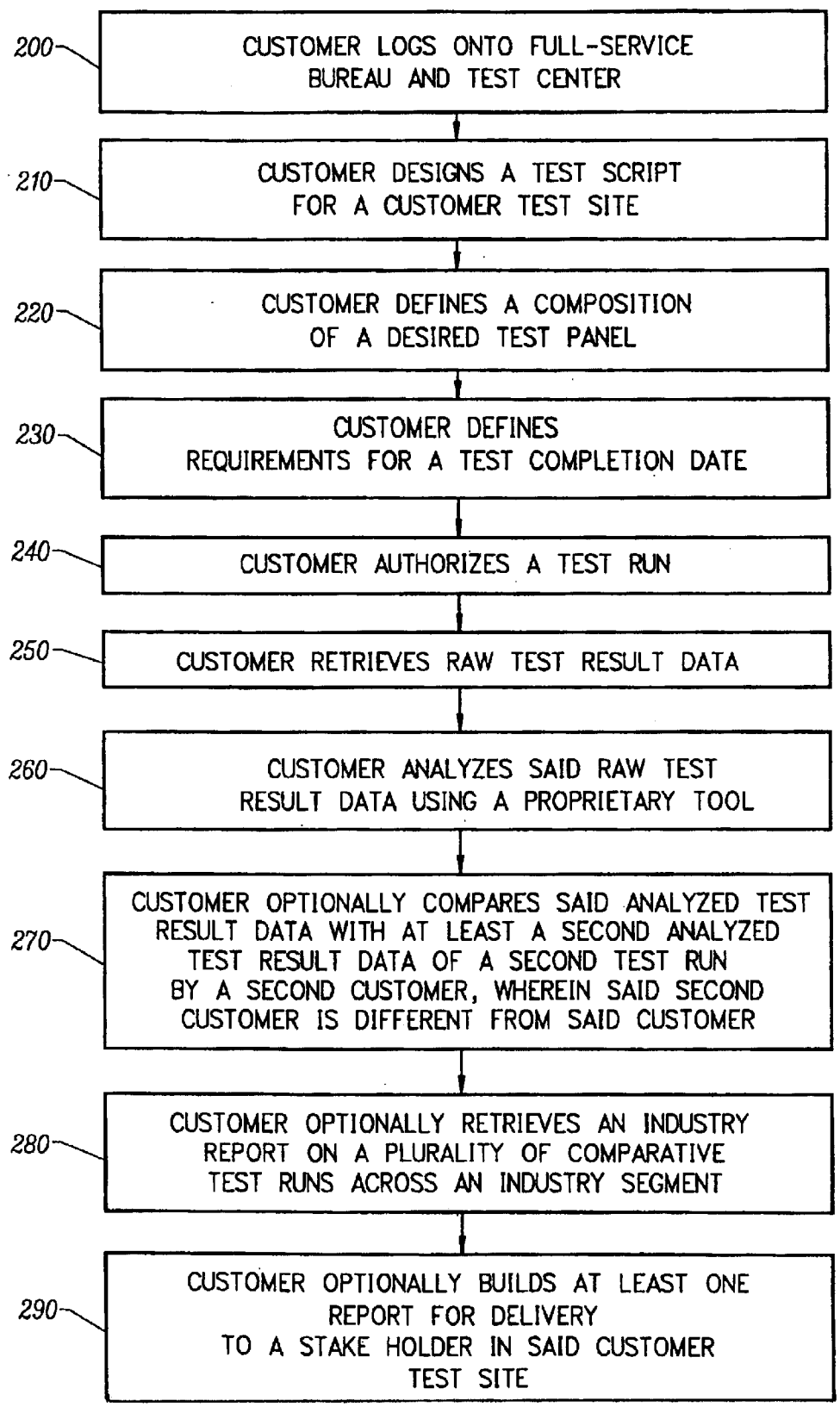
FIG. 2 is a flow diagram showing the steps of designing a usability test according to the invention.

FIG. 2 is a flow diagram showing the steps in designing a usability test according to the invention. In a preferred embodiment, a customer logs onto the full-service bureau and test center (200) and:

designs a test script for a customer Web site, wherein the test script includes, for example, tasks to perform, questions to answer, and items to measure, and wherein the test script is customized from a set of available templates (210);

defines a composition of a desired test panel for each test using factors such as, for example age, location, gender, experience level and personal interests (220);

defines requirements for a test completion date (230);

authorizes a test run after reviewing time and cost estimates (240);

retrieves raw test result data for analysis (250);

analyzes test result data online using a proprietary tool, such as an OLAP-style data mining tool, designed specifically for Usability and Feature Quality™ test results analysis and data mining (260);

optionally competitively benchmarks test results for the customer Web site using an aggregate, anonymous database of other Web site test results that are compiled and maintained by the full-service bureau and test center (270);

optionally retrieves a sufficiently timely or latest Industry Report, for which the customer has purchased a subscription, on comparative Usability and Feature Quality™ test runs across an entire industry segment, such as for example, computer shopping, business travel, outsourced Human Resources (HR) and groupware applications (280); and builds presentation quality reports for delivery to clients or other stakeholders in the tested Web site (290).

Figure 3:
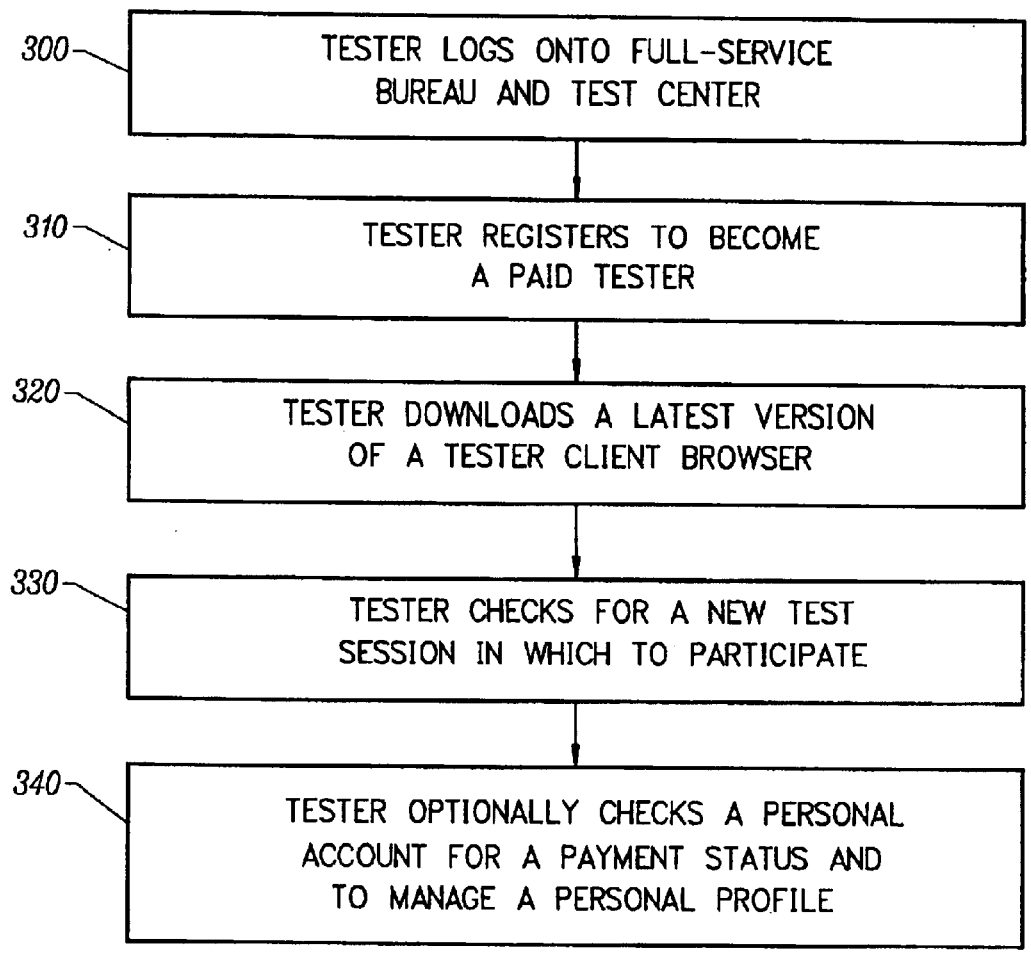
FIG. 3 is a flow diagram showing the steps of using a usability test according to the invention.

FIG. 3 is a flow diagram showing the steps of using a usability test according to the invention. In a preferred embodiment, a tester, recruited through a customer Web site and through the efforts of the full-service bureau and test center, logs onto the full-service bureau and test center (300) and:

- registers as a paid Usability and Feature Quality™ tester for a testing network (310);
- downloads a latest version of the Tester Client Browser, which enables the tester to participate in testing sessions (320);
- checks for new test sessions in which to participate (330); and
- optionally checks a personal account for payment status and to manage a personal profile (340).

Figure 4:
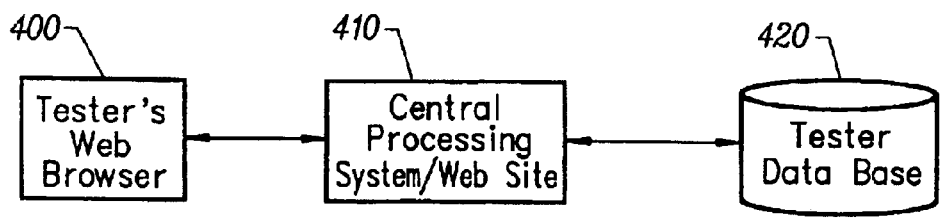
FIG. 4 is a schematic diagram showing a tester registration stage according to the invention.

FIG. 4 is a schematic diagram showing a tester registration stage, according to the invention. In a preferred embodiment, any person or tester connects to the Internet through a tester Web browser 400 and thereby connects to a centralized service, such as a central processing system and Web site 410. The tester submits demographic information, creates a user profile, and downloads data collection software to the tester's Web browser 400. The collection of these registration data creates a tester data base 420.

Figure 5:
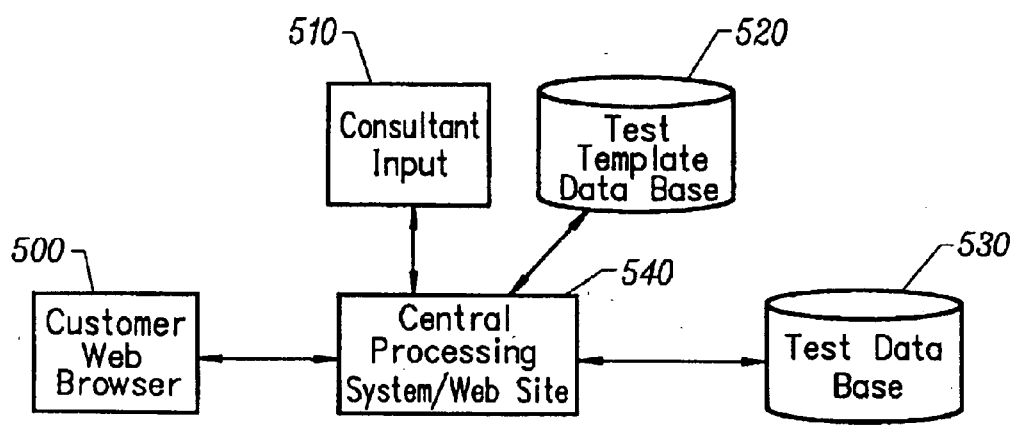
FIG. 5 is a schematic diagram showing a test creation stage according to the invention.

FIG. 5 is a schematic diagram showing a test creation stage, according to the invention. In a preferred embodiment, test creation is performed as a collaborative effort between a domain expert, typically a customer who commissions the test through a customer Web browser 500, and consultants 510 that are familiar with test script internals. A tool, such as a test template database 520, is provided for both the tester and consultants to automate the process either partially or completely. A test script, which is available for download by qualified testers, results. A test database 530 stores relevant test data. Communication between any of the customer's Web browser 500, consultant input 510, the test template data base 520, and the test data base 530 is enabled through a central processing system and Web site 540.

Figure 6:
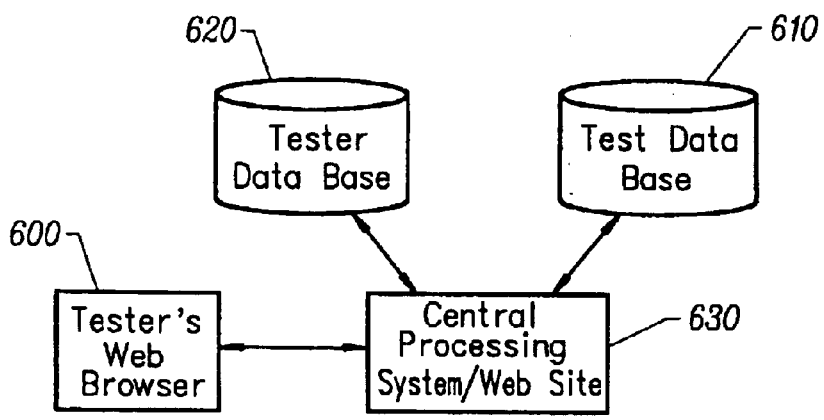
FIG. 6 is a schematic diagram showing a test matching stage according to the invention.

FIG. 6 is a schematic diagram showing a test matching stage, according to the invention. In a preferred embodiment, registered testers who from a tester's Web browser 600 wish to participate in another test visit a centralized depository for tests, a test data base 610, commissioned by many customers. By logging into the depository 610, which in one embodiment is part of a World Wide Web site, the tester's stored demographics 620 are matched by a central processing system and Web site 630, against a desired composition of testing panels that still have openings. If openings are available, they are presented to the participating tester. In one embodiment, the selection of openings triggers a distribution of a complete test. In another embodiment, the selection of openings triggers a distribution of the beginning piece of it a test to the tester's machine 600.

Figure 7:
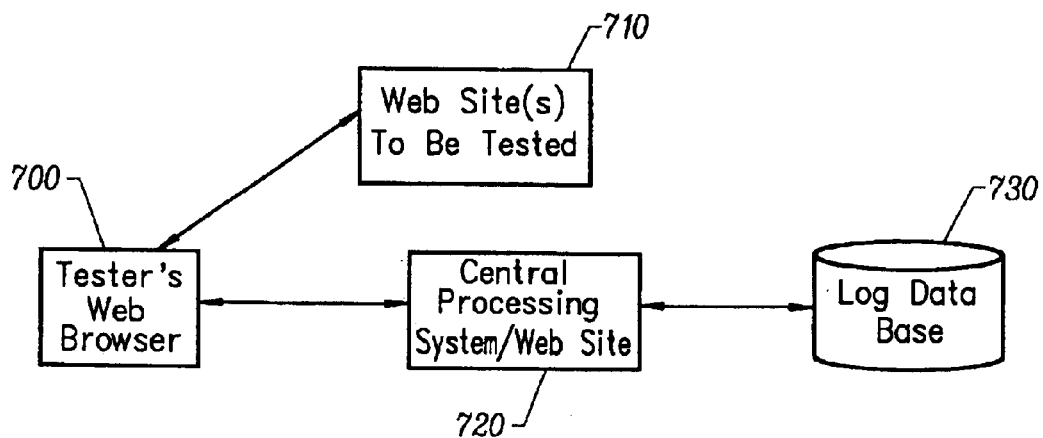
FIG. 7 is a schematic diagram showing a test processing stage according to the invention.

FIG. 7 is a schematic diagram showing a test processing stage, according to the invention. In a preferred embodiment, the tester invokes a test script within a tester's Web browser 700. The tester visits a Web site 710 that is the subject of the test. The tester's Web browser 700 gathers navigation behavior, answers to questions, and other feedback either explicit feedback, such as comments or verbal commentary, or implicit feedback, such as from a video camera trained on tester, an eye tracking system, or a biofeedback response. Actions may trigger additional questions. Responses are transmitted to the central processing system and Web site 720 for storage in a log database 730, either as they occur, or in batches.

Figure 8:
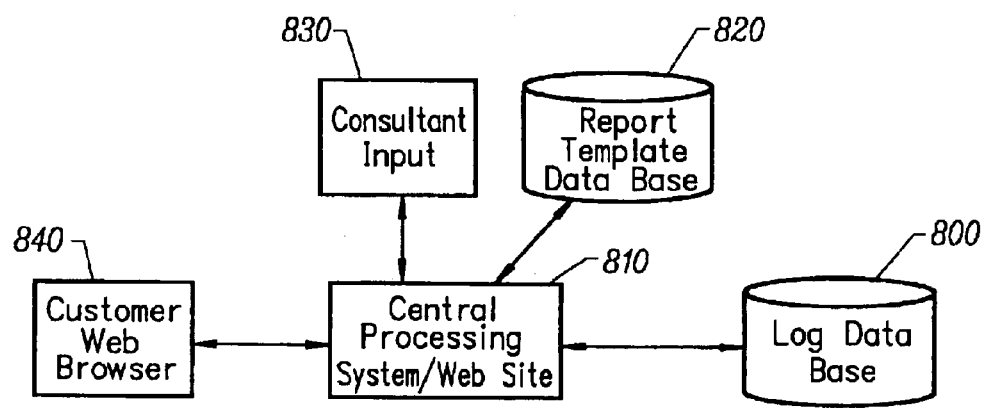
FIG. 8 is a schematic diagram showing a test analysis stage according to the invention.

FIG. 8 is a schematic diagram showing a test analysis stage, according to the invention. In a preferred embodiment, upon completion of a test by a testing panel, test results stored in a log database 800 are combined by a central processing system and Web site 810 to provide a report to a customer. A report template database is provided. In one embodiment, an analysis process includes a review by a consultant 830. In another embodiment, the consultant's efforts are leveraged by automated statistical processing tools or other analysis tools. The resulting conclusions and supporting data are distributed to a customer's Web browser 840 electronically or are distributed in paper form. In another embodiment, a customer is granted access to underlying data in the log database 800, enabling the customer to perform analysis of the data. In a preferred embodiment, the customer Web browser provides an interface to the log data base 800 and is adapted to provide the construction of queries in an intuitive format.

Figure 9:
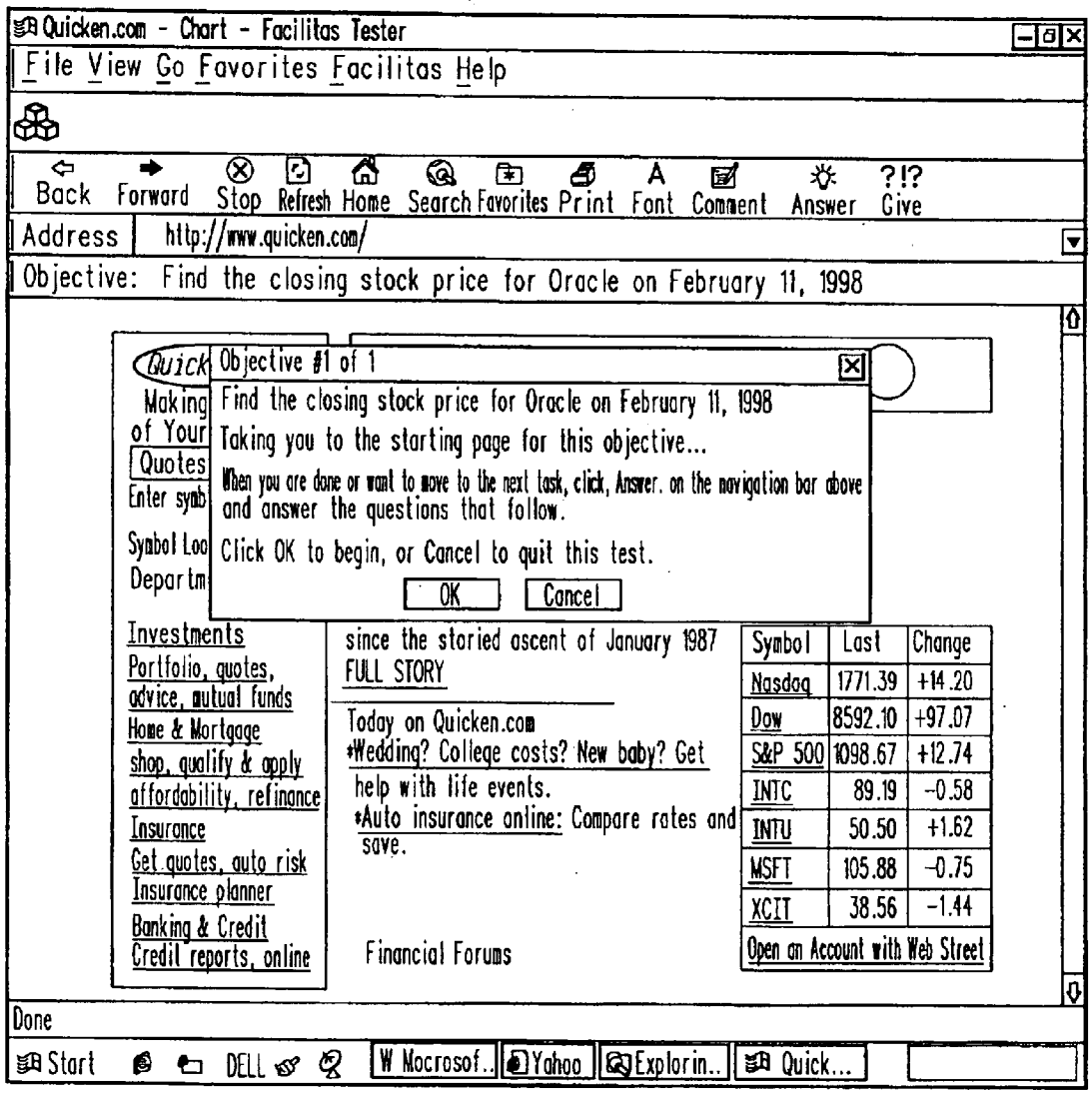
FIG. 9 is a screen shot of a tester client browser according to the invention.

FIG. 9 is a screen shot of a tester client browser according to the invention. A tester is asked to complete a first customer objective.

Figure 10:
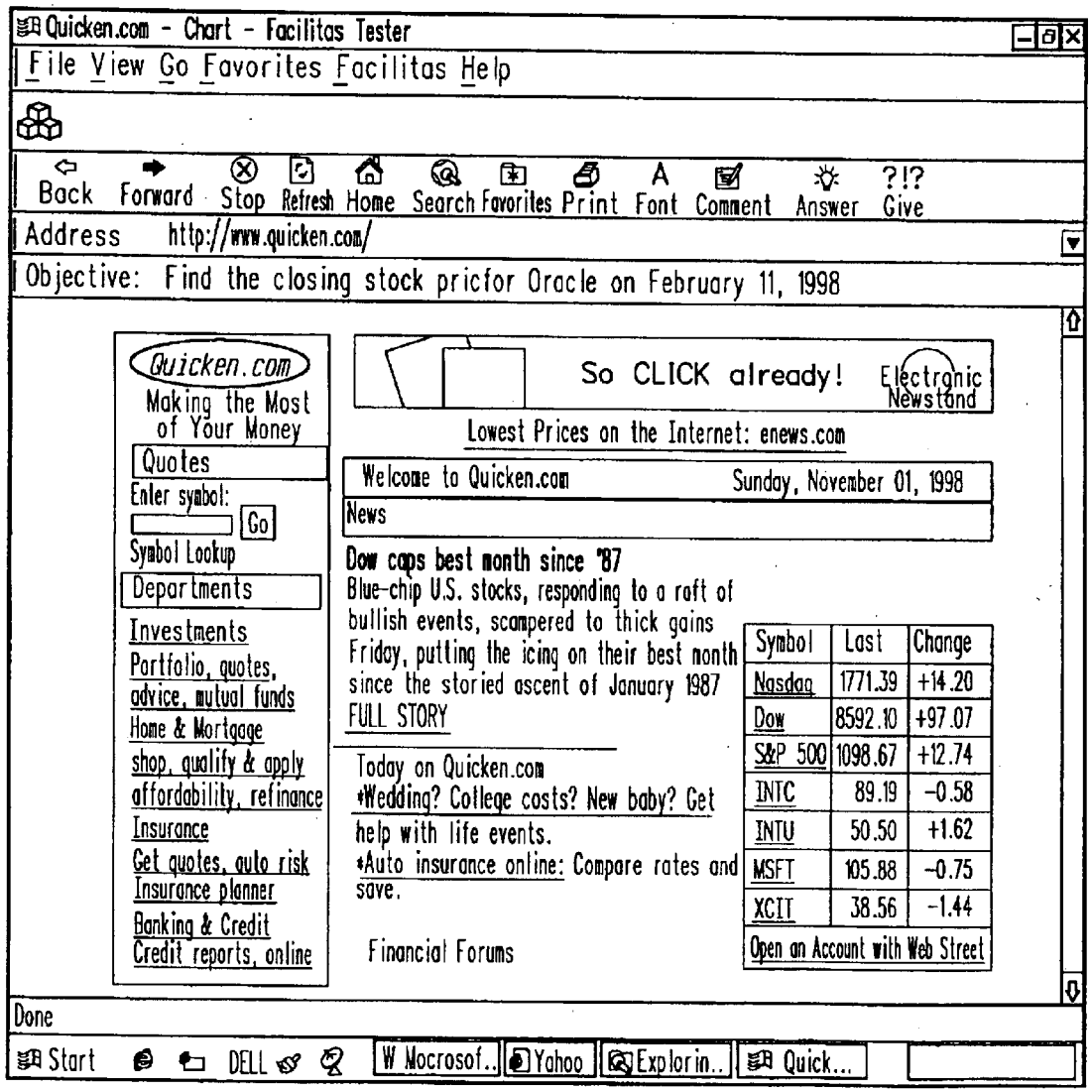
FIG. 10 is a screen shot of a tester client browser according to the invention.

FIG. 10 is a screen shot of a tester client browser according to the invention. The tester is in the process of completing a customer objective.

Figure 11:
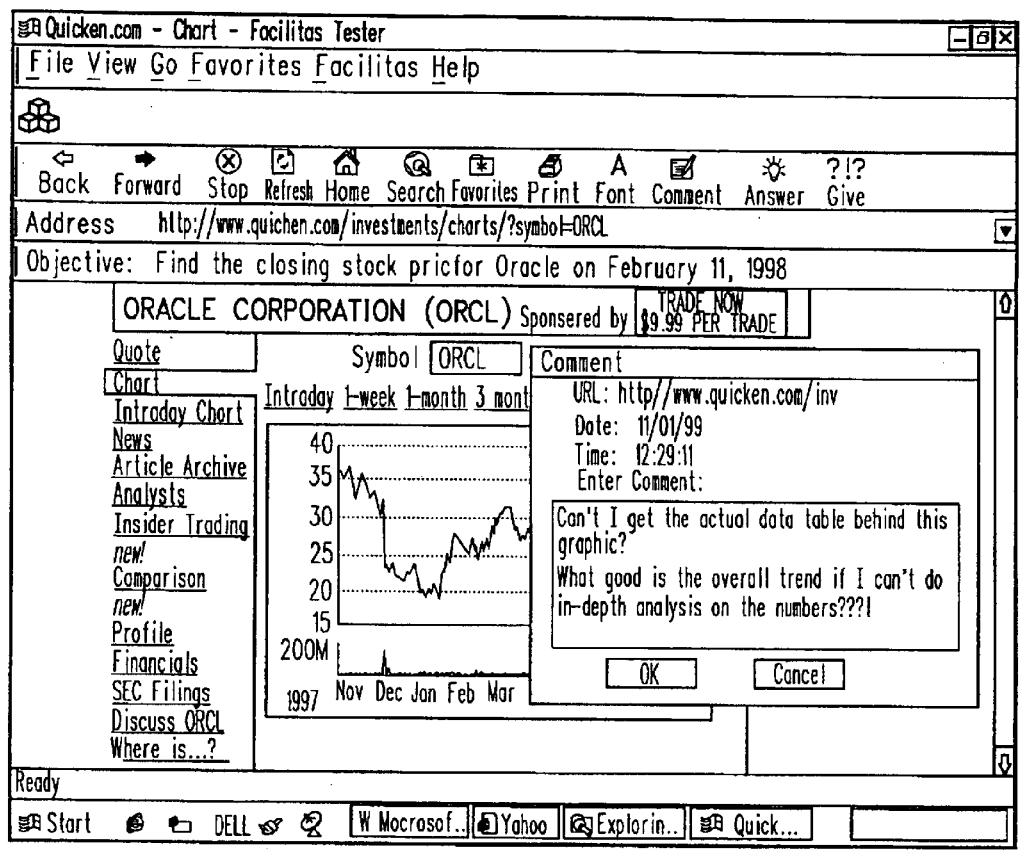
FIG. 11 is a screen shot of a tester client browser according to the invention.

FIG. 11 is a screen shot of a tester client browser according to the invention. The tester is in the process of submitting a free-form comment, according to an embodiment of the invention.

Figure 12:
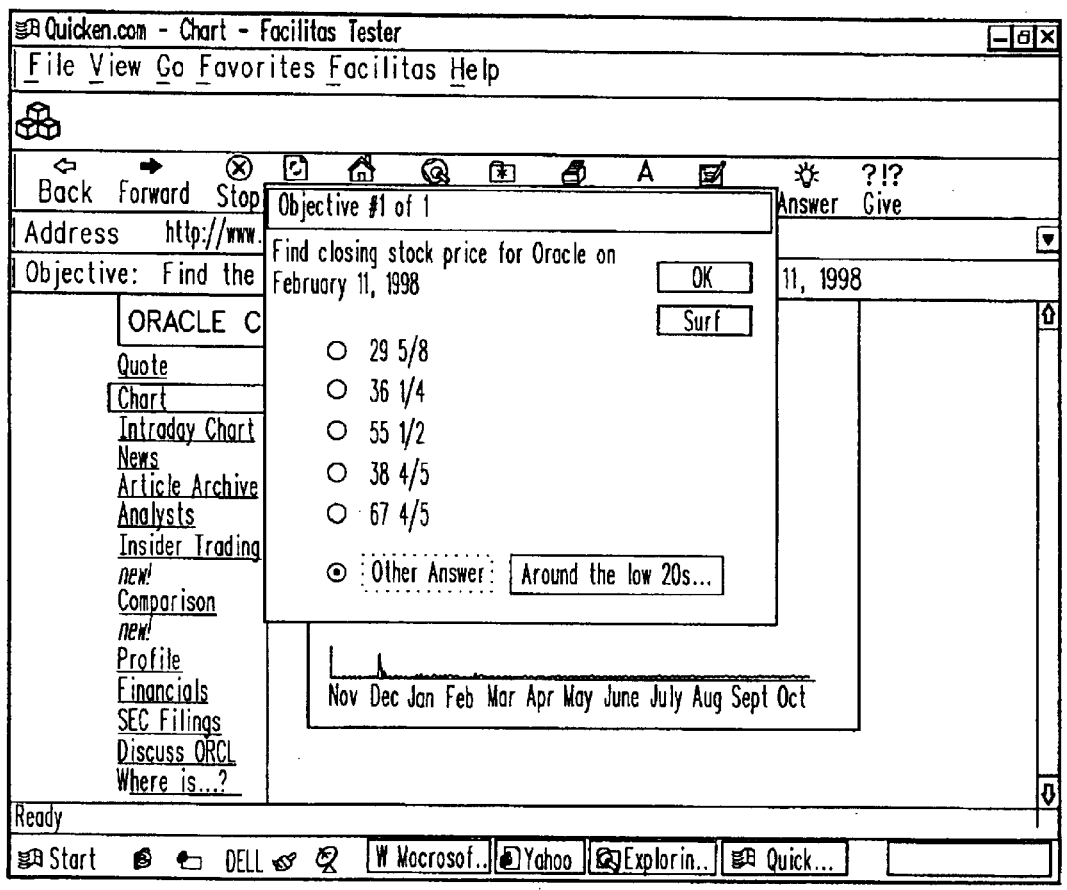
FIG. 12 is a screen shot of a tester client browser according to the invention.

FIG. 12 is a screen shot of a tester client browser according to the invention. The user is answering the question asked in the first customer objective.

Table A below shows a preferred embodiment of an architectural design of a modified browser comprising a usability test, according to the invention.

TABLE A

General Architecture

Figure 13:
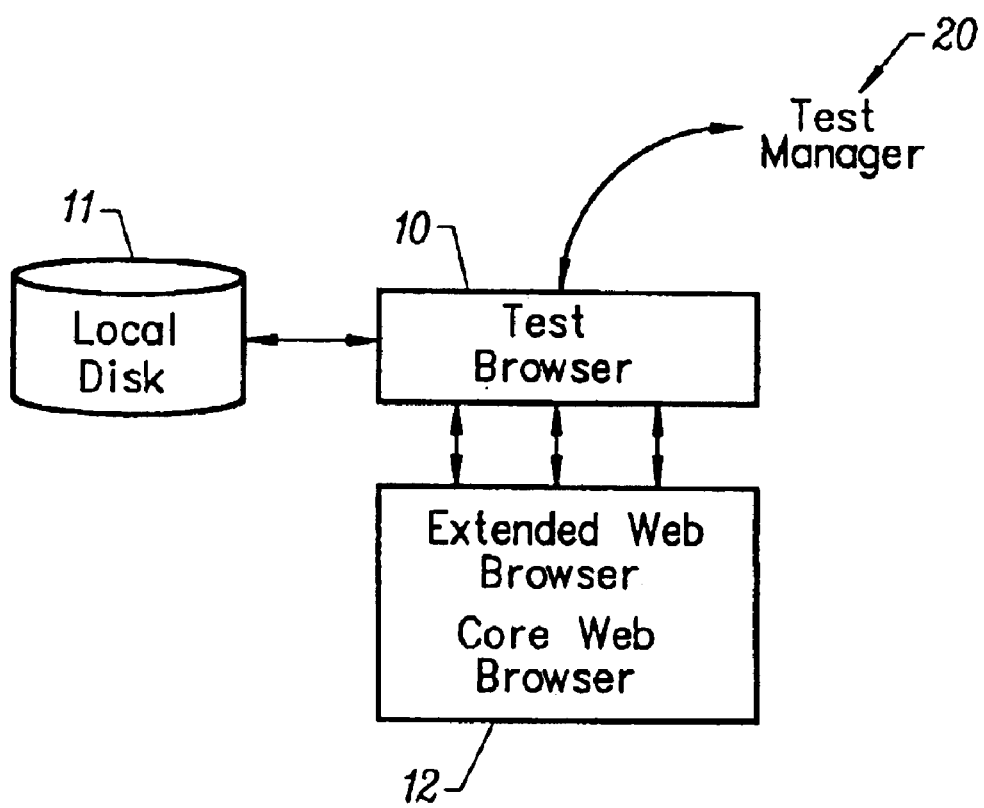
FIG. 13 is a block schematic diagram of an exemplary system architecture according to the invention.

The Test Browser is conceptually a series of components that interface with a web browser to provide the functionality of data collection and test moderation. The version described in this document is implemented to work with Internet Explorer, though a clearly designed interface to the browser functions permits the easy development of alternative versions (see FIG. 13).

At the highest level, the Test Browser 10 is an application that interacts with a test manager 20 to retrieve test scripts and report results, and the web browser to display web pages encountered during the operation of the test script. The local disk 11 of the machine that is running the test browser may be used for temporary storage of the script or partial results (log file).

Communication between the Test Browser and the Web Browser 12 is through a series of TestEvents. The Core Web Browser is extended (forming the Extended

TABLE A-continued

Web Browser) to send certain messages to the Test Browser (or other components interested in receiving the notifications). The Core Web Browser (such as the combination of MSHTML and the Web browser Control in Microsoft Windows) is used to render HTML and other multimedia types, as well as process scripting and programming languages like JavaScript and Java.
Test Browser Application
The test browser application is composed of objects that encapsulate:
    1) The test script (CTestQuestion, CTestStore)
       TestQuestion
This class encapsulates the information associated with one test question: the text of the question, its title, the responses, the type (multiple choice, free responses, enter a number), and the tester's answer to it.
       TestStore
This class is responsible for loading the test from disk or remote file server into the TestQuestion structures used by the Facilitas Test Browser.
    2) The event log (CEventLog, CEventHistory)
       EventLog
This class stores the history of steps (e.g. page views and testing events, enumerated below) that the tester has followed during this test session. It is responsible for keeping the implementation details of the storage media and location opaque to the rest of the Test Browser application.
       EventHistory
This class keeps track of the events separated by each browser window.
    3) The test session (CTestSession, CTestState)
       TestSession
This class maintains the login state of the tester, the amount of time that has elapsed during the test, and indicates when questions and objectives are to be displayed.
       TestState
If a tester wishes to stop a test in progress, the TestState class records the browser and test state, allowing the tester to resume the test at his convenience.
    4) The test engine (CParser)
       Parser
This class implements a simple predictive parser LL(1) (See Also, Sethi, and Ullman, p. 64). It uses information from the event history and responses made to previous questions to determine whether to ask any of the "behavior-triggered" questions.

File Formats

The current implementation of the Test Browser uses persistent (disk) storage in place of a real time connection between a test manager server and the tester client. There are three separate file formats: the Test File, which directs the Test Browser what objectives to give to the client and what additional questions to ask; the Log File which is the result of the tester's performance on the test script; and the Saved Test, which essentially pickles the state of the test in progress so that a tester can resume a test at his convenience. In order to make things as easy as possible for the tester, the saved state is appended directly to the log file, obviating the need to deal with another set of files. The state is overwritten when the test is resumed.

Test File

The Test File is made up of 3 segments:
1) a header;
2) "standard" questions; and
3) triggered questions.

Each of these sections are covered below.

Header

Keyword "FACILITAS" all caps.

Test Battery ID: Integer (the key value in the database for this customer test)

Test File name: String (space terminated) (Filename stem used for logfile on tester's machine. A hyphen, followed by the tester login is added to form the complete filename.)

Minimum Build #: Integer. Used for version control between script and browser. Each major build of the browser increments this number. If a script is run on a browser with a build number of less than the script's number, it might not work (because it may require features added to the browser after the tester's version) so it just reports an error and suggests they download a new version.

Number of "Standard" Questions: Integer

Number of "Objectives": Integer

"Standard Questions"

Question Text: New-line terminated sequence of characters (including spaces)

Start URL: String. If <3 characters, then "don't change"

Number of Response: Integer

Number of Repetitions: Integer

Response Type: Integer

Bits 0–4: Response Type:
   1: Radio Button
   2: Check Boxes
   3: Single Integer Entry Box
   4. Text box display (no entry)
   5. Text blurb entry (for paragraphs)
   0, 6–31: Reserved for future use Bit 5: 1="Objective", 0="Normal Question" (+32 if yes, +0 if no)

Bit 6: 1="Use last response as the title of dialog box"; 0="Use all responses as normal responses" (+64 if yes, +0 if no. Generally should use for all except objectives.)

Bit 7: 1=Add an "Other Answer" option" 0=don't. (+128 if yes, +0 if no)

Bit 8: 1=Add "Info not here vs. Can't find it" question on giveup (+256 if yes, +0 if no)

Bit 9: 1=Advance objective with a success (generally used for triggers +512 if yes, +0 if no)

Bit 10: 1=Advance objective with a failure (generally used for triggers +1024 if yes, +0 if no)

Example: A free text box, not an objective, that asks specifies a title:
What is the most confusing thing about this task?
a
1 1 69
Survey on Objective #3
Description:
Text of question on first line.
Second line "a" indicates do not go to any URL.
Third line: First "1"=one response (the dialog box title) Second "1"=show this question at most once. 69=text blurb entry (5)+use last response as title (+64).
Next Line is text of first response (but in this case, also the last response, therefore the dialog box title).
Responses: New-line terminated sequence of characters (including spaces)
"Trigger Questions"
All elements of a "Standard Question", plus:
Trigger: New-line terminated sequence of chars (See section on triggers for syntax/format)
Log File
Essentially a trace of the tester's interaction with the browser, the log file is line based. Each line is a separate event. Lines have a largely common structure (which might be further rationalized for ease of loading into database).
Event Code: Integer
1: Back
2: Forward
3: Search
4: Stop
5: Refresh
6: Go to "Start"
7: Go to Typed URL
8: Go to URL from drop down box
9: Comment
10: Answer question
11: Page load complete
12: Behavior Triggered question
13: Followed link
14: Item selected from back history
15: Item selected from forward history
16: Give up
17: Go to start URL of objective
18: Find in Page
19: Stop test
20: Restart test
21: Pause
22: Give up on whole test
23: Add bookmark
Date: Date
Time: Time
Elapsed Time: Integer (in number of seconds)
Question Number: Integer
Objective Number: Integer
Frame ID (as a 7 digit ID)
Other info:
Event Code: 1–8, 13, 14, 15, 17: Source URL, Page Title, Destination URL, POSTed data
Event Code: 9: Comment Text (new-line terminated sequence of characters)
Event Code: 10, 12: Binary encoding of answer(s) selected. First answer=1, Second =2, Third =4, etc. If "other" is selected, a text string follows with contents of text box
Event Code 11: Number of Links: Integer; Words per Link: Float; Number of Images: Integer
Event Code 16: Comment Text (new-line terminated sequence of characters)
Event Code 18, 19, 20, 22: None.
Event Code 21: Length (in seconds) of paused time
Event Code 23: URL added to bookmarks
Saved Tests in Progress
Test URL: String delimited by &'s, since it may contain spaces
Current Question: Integer
Current Objective: Integer
MaxReps[ ] & Response[ ]: pairs of Integers, 1 per TEST_SIZE
Number of Open Browser Windows:
For Each Open Window:
Number of Entries in History List: Integer
Current Index into History List: Integer
Entries in History List: Strings, pointers to Frame History, [0] first, up to [SIZE]//Currently, FrameHistory is forced to NULL, i.e., frame status is not saved/re-loaded
Pause Time: Integer, clock entry at time of save
Time Offset: Integer, difference between clock time & elapsed time
Event Window Index: Integer
Event. Code[ ] & Event Time[ ]: Pairs of integers, 1 per WINDOW_SIZE (event time is elapsed time)
Triggers & Parser
Behavior-based questions are asked when the trigger condition is met. The trigger is a Boolean expression with traditional compositional semantics. The syntax is described in the context-free grammar below (Trigger is the start symbol). The primitives are described after that. Note that the language has been designed so that one token lookahead is always sufficient to correctly determine the next parsing step.
Trigger→Condition|AND (Condition, Trigger)|OR (Condition , Trigger)|NOT (Trigger)
Condition→EV=(EventType, EventType)|!=(IntType, IntType)|>(IntType, IntType)|<(IntType, IntType)|= (IntType, IntType)
MATCH (TextType)|XITMATCH (TextType) |RANDOM (IntType, IntType)|LOADCOMPLETE (TextType)
IntType→integer|CURRENTQUESTION|RESPONSE (IntType)|TIMESINCE (EventType) |NUMBERINWINDOW (EventType)|LOADSTATUS
EventType→TYPE (IntType)|IntType
TextType→character string delimited by white space
AND, OR, NOT: Typical Boolean interpretation
==, <, >, !=: Typical integer comparators
EV=: Event Equality. Tests whether one Event Code is equal to another or to a constant. Separate event and integer equality for semantic hygiene. An alternative way to do it is to have a function to cast from event types to int's.
CURRENTQUESTION: A special symbol bound to the current question number that the tester is working on. Questions are numbered consecutively in the order of the test file, starting with 0.
RESPONSE (X): The tester's response to question #X, always an integer.
TIMESINCE (Y): The number of seconds which have elapsed since the last event of type Y. If none occurs in the event history the value is 99999.
NUMBERINWINDOW (Y): The number of events with Event Code=Y in the event history TYPE (X): Uses X (probably a small negative number) as an offset into the event history, and gets the event code of that event. For example TYPE (0) is the event code of the current event, TYPE (−1) the previous event, and so on. An Integer used as Event Type corresponds to the EventCode, as defined in the Log File format.

MATCH (URL): True iff the current URL of the page the tester is going to matches (currently strcmp) the argument XITMATCH (URL): As above, but the URL of the page the tester is leaving LOADCOMPLETE (URL : As above, but the URL of the page after the page load is complete RANDOM (X, Y): True if and only if a random number between 1 and X is less than a second random number between 1 and Y. (i.e. RANDOM (40, 100) is true 40% of the time. Used to prevent a question from becoming repeated too frequently, among other things.

LOADSTATUS: Variable that contains the "reason" why test triggers was called: 1=About to leave page; 2=Page load complete; 3=About to Enter Page; 4=Timer expired Extensions for Trigger Language URL matching: Rather than strict equality, strip off query string, and remove any digits before first dot in URL. E.g. www3.sportsline.com matches www.sportsline.com. Other match functions may permit partial matches (any .com domain, or any sportsline.com domain e.g.)

COUNT (X): Used to fire the trigger every X-th time. Each trigger has an associated counter with it, and if the other conditions are met, the counter is incremented. If the counter then matches IntType X, the trigger fires, and the counter is re-set to 0. If the counter is less than X, the trigger does not fire.

TEXTMATCH (X , Y): True if and only if X appears in Y. To be added when responses may contain free text.

NUMBERINWINDOW (X , Y): The number of events with Event Code=Y in the last X events of the history Clock While it is interesting and useful to know the absolute time that certain events occurred (e.g. did people testing at noon find the site slower than those testing at 3AM?) it's also useful to know the duration of certain tasks, but it isn't fair to penalize people for spending a long time writing comments, reading the question, or taking a break. Therefore, it's also important to track the relative time (elapsed time in seconds) since the start of the test, pausing the count for any events that should be "off the clock".

This is accomplished by maintaining a "Time Offset" value that indicates the difference between the current system clock and the start of the test. Time Offset is initially set to the system clock at the start of the test. 1 second later, the elapsed time is system clock—Time Offset, yielding 1. Suppose we want to pause the clock for 30 seconds while the tester enters a comment. At the start of the "Clock Off" time, we store the current system clock in a temporary variable, Pause Time. At "Clock On" time, we add the difference between the current system clock and the Pause Time (which is the amount of time the clock should have been paused) on to the Time Offset.

However, due to the asynchronous nature of some of the procedure calls as well as events going in multiple windows, it's not clear that the pause/restart events will always occur in consecutive pairs. That is, there might be two calls to pause before a single call to restart. Therefore, using a single variable is insufficient. Instead, a stack is effectively required. But the times of intermediate pauses (any but the first) are not relevant, since the clock is already stopped. Therefore, the representation used is a single PauseTime variable that is set if the clock was currently running. The PauseCounter is set to 1. Additional "pause" calls increase the counter, but do not change the clock. Restart calls decrease the counter. When the counter hits zero (all pauses have been restarted) the difference between the current system clock and the pause time variable is added to the Time Offset. If a time is logged while the counter is paused (due to an event in another window, for example), the difference between the current system time and the Pause-Time is effectively added to the TimeOffset to determine the elapsed time for the current log entry.

Internet Explorer Specific Details

Figure 14:
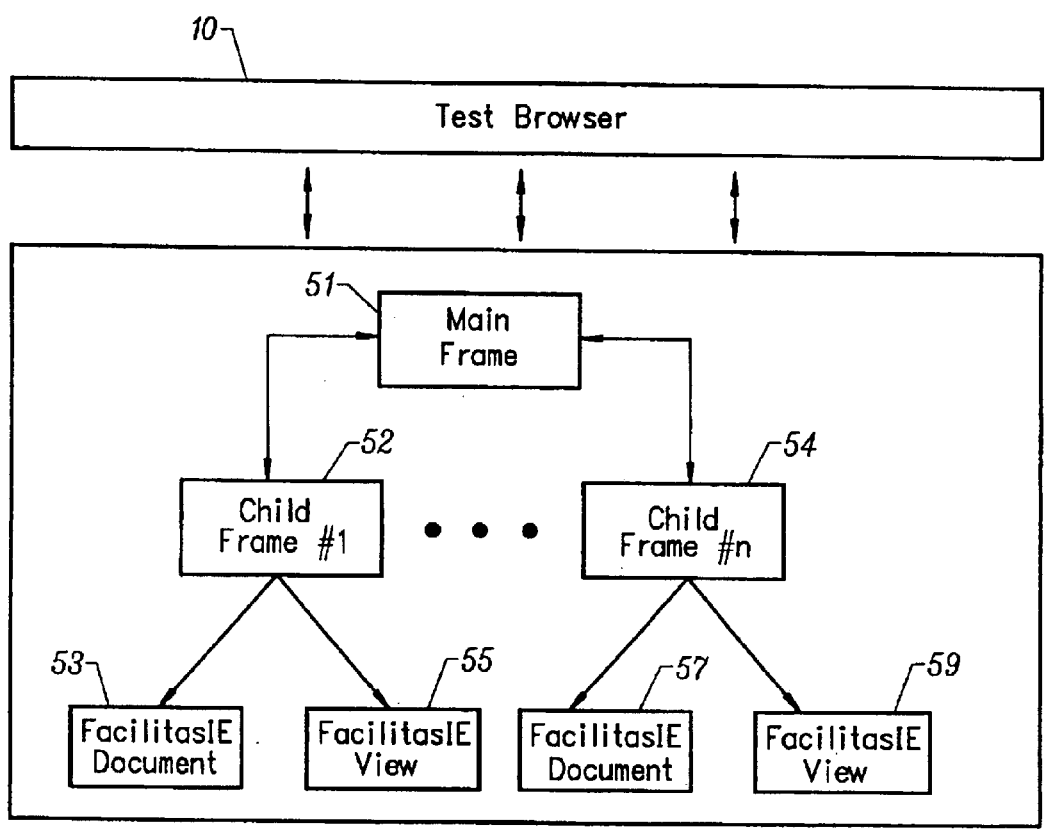
FIG. 14 is a block schematic diagram of a specific implementation of the browser according to the invention.

Extended Web Browser, Internet Explorer version (see FIG. 14)

The Test Browser is a MFC application of the "Multiple Document Interface" variety. The relationship among these files is shown in the figure.

The main files are:

MainFrame

The MainFrame 51 manages each of the ChildFrames 52, 54, keeping track of which one is active. The MainFrame also catches messages that apply at the level of the application, such as quitting.

ChildFrame

This class controls the windows for each of the browser frames. It adds the "chrome" (the button bar, the URL address box, and the Objective ReBar when a test is in session). It supports updates to the Objective ReBar.

FacilitasIEDoc

The Document class 53, 57 is a shell. When a new document is created, it calls the ChildFrame to add the Chrome.

FacilitasIEView

This class 55, 59 catches most of the messages from the navigation tool bar (anything that is specific to one browser frame, like Forward, Back, Home), as well as those that are window specific (such as font size). It also catches return messages from the webbrowser control that indicate when a document has loaded.

Access to HTML

Each FacilitasIEView is also a HTMLDocument2, so when called with the appropriate interface, it's possible to access the structure of the HTML document, getting full HTML text, or collections of the images, or tags.

History Lists

The HistoryList is a class defined to abstract the operation of history lists and the related frame history list. It is implemented as an array for each ChildFrame, an array of CStrings that stores the URL, and an array of pointers (to FrameHistoryLists). A third column stores the page titles. The HistoryList class also has an integer data member which acts as an index into the array. The first page displayed in the window is at slot 0, the second page is at [1].

HistoryList.GetURL(HistoryList.GetIndex) is the URL of the current page. Going back or forward involves decrementing or incrementing the counter. Deeper jumps (via the file "go" menu or drop downs) are just bigger offsets to the index. Allowing back jumping means that the history kept by the Webbrowser control is no longer accurate. Therefore, all navigation, including forward and backward one step, which would be part of the webbrowser control must go through the separate history list instead.

A related problem is when to add a page to the history list. Doing so immediately upon requesting the page is problematic, because if the page takes too long to load and the tester hits stop, that page shouldn't make it on to the history. On the other hand, waiting until the page is completely loaded is too long—if the tester follows a link before all the images from one page load, that page should still be in the history list. The current choice is to add a page to the history list at NavigateComplete, which happens before all the graphics are downloaded. However, the current implementation does not provide enough information for all of the event codes to work this way. In particular, jumps in the history via the "go" menu or drop downs are recorded instantly, even if the navigation is cancelled quickly.

Frame History Lists

Frames are used primarily in two ways by web sites:

1) Positioning certain types of content (such as ads);
2) Providing an outer "host frame" that may include a navigation bar, while the inner frame contains the changing content.

The desired behavior of the Facilitas Test Browser is different in these cases. In the first, the frame should be treated essentially as an embedded graphic, and not generate a log entry when the frame loads to completion. In the second case, however, we need to recognize that the completion of a frame load is a significant event. Nested frames have different IDISPATCH interfaces (stored in pDisp) that indicate when a navigation completion is that of a top level page (if pDisp=GetApplication( ) or a real navigation within the frame (case 2 from above) in which case the frame pDisp is the first in a stack of open navigate calls; or (case 1 from above) it is not at the top of the stack, and is in fact a constituent frame, requiring no action.

Figure 15:
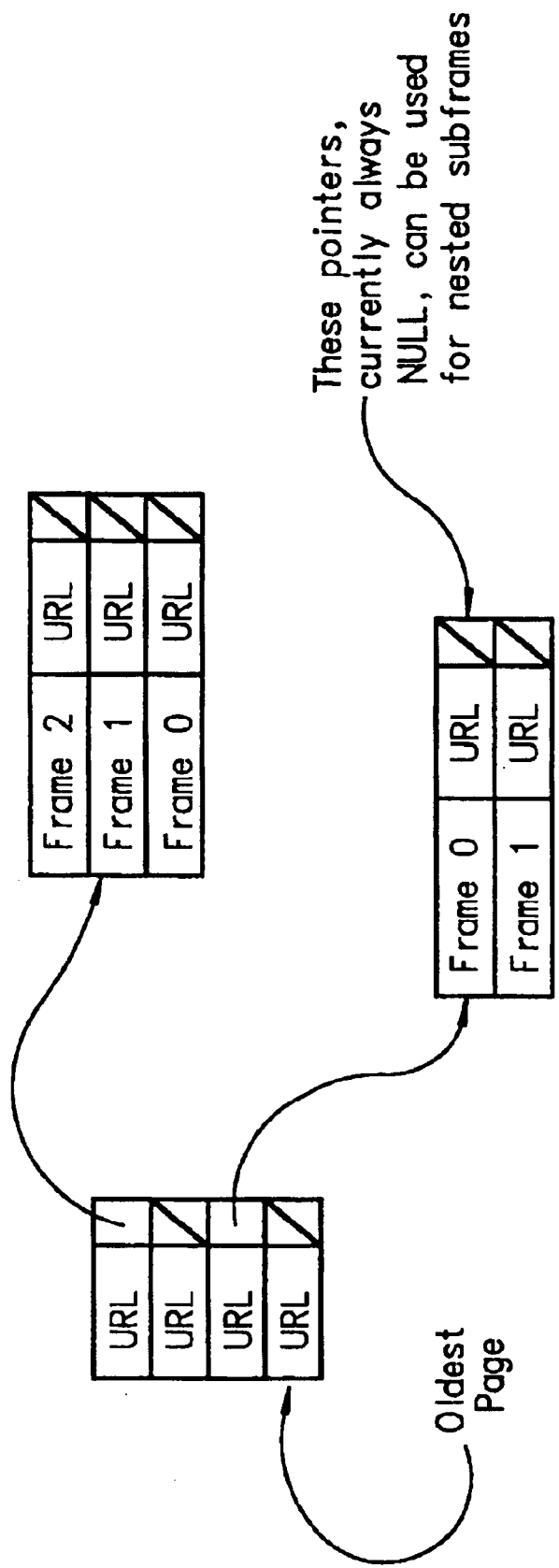
FIG. 15 is a block schematic diagram showing frame history lists according to the invention.

If a top level page, then the page history should get updated. If Case 2, the move should be recorded in the history, but in a special way: once you move out of the hosting frame, it should disappear (so people can't navigate to a sub-frame without going through the hosting frame). In addition to storing the URL in the history, it is also necessary to store the frame name, so the page can be appropriately re-generated if it is selected from the history. The resulting data structure is essentially a separate stack (showing the frame history) for each page in the stack of page history. The frame stacks have two strings (a URL and a frame name) and a pointer to another stack history which can be used to handle recursive display of frames correctly. The URL for the hosting frame (the one designated_top) is stored in the page history. Any subsequent navigations within that frame set are stored in the frame history stack. When history lists are generated (in the "go" menu or drop downs) the frame history list for the current page only are included as the nearest neighbors of the current frame, followed by the adjacent entries in the page history stack. If you navigate away from a frame history stack, it seems to "collapse" in the history lists ("go" menu). But if you navigate back to that URL (of the hosting frame), the frame history stack re-appears, with all the local frame navigation events once again listed in the "Go" menu. It's confusing, but it's how IE works . . . Moving forward and backward through the frame set is a bit complicated. Once you move backwards from Frame[0] in the Frame history stack, you go back to the hosting frame in the page stack. When you go back from that, you go to the previous page in the Page History Stack. See FIG. 15. The data structure to store a Frame History Stack is a subclass of the Page History Stack, with an extra field (and access methods) to store the frame name.

In this example, there have been 9 navigation events, the URL's were visited in order from URL 0 to URL 8. URL1 is the host frame, in which URL's 2 and 3 were sub-frame navigations. URL 5 was the host frame for URL's 6 through 8. Suppose the tester is at URL3: the go menu displays URL's (0,1,2,3,4,5). If the tester is at URL 4, only (0 1 4 5) are displayed. At URL 6, (0 1 4 5 6 7 8) is displayed. In general, the back button subtracts 1 from the URL number in this example.

Exceptions are:

Going back from 0 is not permitted, back from 4 goes to 1.

Table B below shows a sample test script of a usability test according to a preferred embodiment of the invention.

TABLE B

Sample Test Script for MASKED_SITE Communities
Test panel screening requirements
Number of testers required: 150
Male/female ratio: 50/50
Last test completed by: November 15th, 1998
Web experience required: No requirements
MASKED_SITE experience required: No requirements
On-line community experience required: No requirements
Behavior Tracking Detail
1) Implicit data to be collected
    a) Links (by task, by site, and by test session)
        i) Links clicked on
        ii) Links seen per page
        iii) Length of links (in words) (how to deal with image links?)
        iv) Image links (percent of total links that are images, etc.)
        v) Position of clicked links on the page
    b) Number of distinct sites visited (and what they were)
    c) Scroll Coverage
        i) Percent of page actually covered by scrolling
    d) Wait time
        i) Wait time attributable to server response latency (waiting for the server to get to you)
        ii) Wait time attributable to data download time (getting the data)
    e) Frequency of all buttons on the browser again, by page, site, task and test)
        i) Stop
        ii) Back
        iii) Forward
        iv) "Expressions of frustration/impatience", through rapid multiple clicks on a single button TABLE B-continued

- v) Go (plus length of go jumps in pages)
- vi) Home (and address of Home button)
- vii) Refresh
- viii) Comment
- ix) Pause
- x) Answer f) Average Time
- i) Spent on a given page
- ii) Spent on the average page on a site
- iii) Spent on the average page on a task
- iv) Spent on the average page on a test
- v) Spent on a site overall
- vi) Spent on a task overall
- vii) Spent on a test overall g) Pages
- i) Number of pages in a site
- ii) Number of pages in a task
- iii) Number of pages in a test session
- iv) % of static vs. 'dynamic' pages
- v) Page length
    - (1) Measured by "scroll percentage", i.e. how much of a page shows up in one screen-this is a relative measure and vary depending on the monitor size...
    - (2) Measured by physical length (lines of text)
    - (3) Maybe measured by word density (number of words/physical length)
- vi) Number of images per page
- vii) Average size of pages, and exact size of any visited page
- viii) % of page size from images vs. text h) Searches
- i) Number of searches (per task, per test and per site)
- ii) Page views between searches
- iii) Time between searches (breakdown of surf time vs. wait time)
- iv) Time/page between searches
- v) Speed of search results (i.e. total wait time, with as much breakdown as possible)
- vi) Resets (back, stop, go) per search, and placement of resets
- vii) Number of results per search (possible?)
- viii) Search terms, and (explicit) whether they got what they wanted i) Ads
- i) Number/percent of pages with ads on them
- ii) Percent of ads "not seen" because the tester didn't scroll to look at them
- iii) Ad clickthrough rate (by task, site, page, and test. Also by user parameter-who clicked--and specific ad-which ads got clicked.)
- iv) Number of page views, time, and all that stuff, per clickthrough (in other words, a clickthrough signifies a new "visit" with a kind of a new user objective, and we would like to study this behavior on a stand-alone basis)

j) Separate browser window opened (page, time, path taken)
k) Cookies on/off, and any changes in status
l) SSL on/off
m) Comments
- i) Time spent on comments
- ii) Length of comments (total Kb, for instance)

n) Use of plug-ins
o) Downloads and install usability
p) Embedded object interactions and events
- i) Macromedia Flash applet
- ii) Real Networks
- iii) NetMeeting
- iv) IP Telephony q) Mouse over behavior
- i) Some way of graphically displaying mouseover density on a page, especially on unclicked links, ads and images
- ii) Mouse clicks-even on unclickable objects r) Other page interactions
- i) Pull-down menus
- ii) Radio buttons
- iii) Search boxes (items typed in even if they did not hit submit)
- iv) Other interactive items embedded in a page
- v) Horizontal scroll activity (big red flag on page formatting)

s) Errors
- i) Log all errors (404, etc.)
- ii) DNS not found, IP-level timeouts t) Snapshots
- i) Ability to capture "snapshots" of all metrics when a certain comment is being given, i.e. the state of the test up to that point, since things can change between the time a comment is given and the end of the test.

TABLE B-continued

Pre-Test Questionnaire
1) General Information
    a) Name
    b) Email
    c) Gender
    d) Age
    e) Zip Code
    f) Profession
    g) Years on internet
    h) General Interests
    i) Monitor size
    j) OS Type
    k) Connection speed
    l) Home, office, or home office
2) Have you had any experience with online chat or communities before? (rate 1–5)
    a) If so, which ones? (choose from list)
3) Have you used MASKED_SITE Communities before? (yes/no)
    a) If so, how often? (choose from list)
4) Are you a regular user of any other online community service? (yes/no)
    a) If so, which ones? (choose from list)
Testing Tasks
1) Register to be a part of MASKED_SITE Communities
2) Find and join the Web Design Community
3) Find the bluewave community
4) Send a message to the host
5) Join the bluewave community
6) Create a new community (name it anything you like)
7) Delete the community you created
Testing Task Detail
1) Register to be a part of MASKED_SITE Communities
    a) If registration takes longer than 5 minutes, ask if they are having trouble and why
    b) If they hit the Back button, ask:
        i) Why did you hit the Back button?
            (1) I made a mistake
            (2) The process flow is confusing
            (3) I decided to change/alter my personal information
            (4) The page was too slow to load
    c) After completion, ask:
        i) Did you give your real personal information? (yes/no) Why or why not? (free text)
2) Find and join the Web Design Community
    a) After completion, ask:
        i) Did you have trouble finding this community? Why or why not?
        ii) How easy is it to join this community? (rate 1–5)
3) Find the bluewave community
    a) After completion, ask
        i) Did you have trouble finding this community? Why or why not?
        ii) How easy is it to join this community? (rate 1–5)
        iii) What is this community about?
4) Send a message to the host
    a) Is the host an employee of MASKED_SITE? (yes/no)
5) Join the bluewave community
6) Create a new community (name it anything you like)
    a) How easy was it to set up this community (rate 1–5)
    b) If you put your personal family photos and information here, do you feel like it would be private and secure? (rate 1–5 and free comment)
    c) Can any stranger find your communities site and access its contents?
7) Delete the community you created
Post-Test Questionnaire
1) Would you use this service to set up a community for your family (rate 1–5)
    a) For your business?
    b) For a club or group of friends?
2) Did you enjoy visiting MASKED_SITE Communities? (rate 1–5)
3) How useful is MASKED_SITE Communities to you? (rate 1–5)
4) Would you use it? (rate 1–5) Why or why not? (free comment)
5) Thanks for testing MASKED_SITE Communities. Please feel free to enter any additional comments below.

Table C below shows a preferred embodiment of a network test report, according to the invention.

TABLE C

FACILITAS NETWORK TEST REPORT FOR MASKED_SITE SPORTS CHANNEL MAY 1998

| | |
|---|---|
| INTRODUCTION | 45 |
| TEST PARAMETERS | 45 |
| OVERALL RESULTS | 45 |
| USABILITY FACTOR ANALYSIS | 46 |
| A. INTERFACE | 46 |
| B. STRUCTURE AND LINKS | 50 |
| C. SEARCH | 53 |
| D. ADS | 55 |
| E. CONTENT | 56 |
| TASK-LEVEL ANALYSIS | 57 |
| CROSS-SITE ANALYSIS | 19 |
| USER-LEVEL ANALYSIS | 20 |
| APPENDIX A: TEST TASKS | 62 |

INTRODUCTION

Test Parameters
Test Site: www.MASKED SITE.com
Test Function: Sports-related questions (Appendix A)
Number of Users: 200
Number of tasks per user: 10
Time period: May 1998

Overall Results

| | MASKED_SITE | Group Average[1] | MASKED_SITE Performance vs. Group Average |
|---|---|---|---|
| Success Rate | 50% | 75% | −25% |
| Failure Rate[2] | 30% | 10% | +20% |
| Give-Up Rate[3] | 20% | 15% | +5% |
| User ratings:[4] | | | |
| Effective overall? | 3 | 3.5 | −0.5 |
| Comprehensive? | 3.7 | 3.5 | +0.2 |
| Easy to use? | 3.2 | 2.7 | +0.5 |
| Easy to understand? | 2.7 | 3.8 | −1.1 |
| Fast? | 2.7 | 3.5 | −0.8 |
| Pleasing Design? | 3.4 | 2.7 | +0.7 |
| Average | 3.1 | 3.2 | −0.1 |

"Would you come here again to look for sports-related information?"
 Yes: 10%
 Only certain information: 30%
 No: 60%
"Which sports-related information would you come to MASKED_SITE for in the future?" (1=never, 3=sometimes, 5=always)
 Recent sports scores: 3.6
 Game schedules: 3.5
 Player information: 1.4
 Historical statistics: 1.1

USABILITY FACTOR ANALYSIS

A. Interface
Overall:
 Very effective: 20%
 Effective: 35%
 Ineffective: 40%
 Very ineffective: 5%
 Representative Comments:
 "The interface was okay, a little bland and a little confusing after the first page for the Sports section."
 "I found it hard to navigate once I was off the main page."
 "The main page was good, but after that I often got sent to some other site-very confusing, I lost track of where I was!"
Multi-site sessions:
Average number of sites visited for a given task: 3.2

TABLE C-continued

"Did you feel like you had to visit too many sites to complete this task?"
 Yes: 78%
 No: 22%
 Representative Comments:
 "I am jumping in and out of random sites way too much!"
 "None of the sites which are pointed by MASKED_SITE has the information I need. Lucky, some of those site has links, links to links or even links to links to links to the information. But, I wouldn't say it's anywhere close to 'efficient'. After a while I feel like, 'what's the point of starting from MASKED_SITE?'"
"How many sites do you expect to visit in order to complete this task?"
 No other sites: 60%
 One other site: 30%
 Two or more other sites: 10%
 Representative Comments:
 "I prefer to have the search results pointing a few really good sites, instead of the sites with possible links to the information several jumps away."
 "I can't see why I need to visit more than 3 sites to get a piece of available information!"
 "Of course, the ideal is to have all this information in this site!"
"Visiting too many sites for a task tends to confuse and frustrate me"
 Agree or Strongly Agree: 80%
 Neutral: 10%
 Disagree or Strongly Disagree: 10%
 Representative Comments:
 "All the sites have different layouts, I have such a hard time quickly picking my way through all of those sites in a few minutes"
 "Do you know how many colors and different backgrounds I am seeing while I am looking for a little piece of information? It's too much, not worth the headache."
 "It is frustrating that one site has all the icon buttons on the right, the other has them on the left, then one has them on the top and one has them at the bottom, which I need to scroll down to see them."
Multi-site Summary:
 Users prefer to get information from the MASKED_SITE site directly, with a minimum of visits to other sites. Many visitors feel frustrated when sent to too many sites, citing inconsistent interface and inconsistent quality. Current average for Sports tasks is 3.2. Preferred average is none/one.
Site look and feel:
"How did the look and feel of the site affect your overall experience?"
 Very positive: 10%
 Positive: 10%
 Neutral: 60%
 Negative: 10%
 Very Negative: 10%
 Representative Comments:
 "I don't think the really matters to me. As long as I can use it and it doesn't change too much from page to page."
 "I don't really have positive affect by the look and feel no matter how good it is. But I would have negative if it's bad. However, this site is pretty good."
"How consistent was the look and feel for this site?"
 Very Consistent: 20%
 Consistent: 40%
 Not Consistent: 30%
 Very Inconsistent: 10%
 Representative Comments:
 "I am seeing the same layout all the time. I feel like I 'know' when I am on MASKED_SITE."
 "The coloring and font are very consistent!"
"How pleasing was the look and feel for this site?"
 Very Pleasing: 10%
 Pleasing: 40%
 Not Pleasing: 30%
 Very Displeasing: 20%
 "I like the colors, they're not too bright, but catch my attention."
 "I like the position of the navigation bars, it's convenient and I never have to scroll for it"
 "I like the logo!! ☺"
"How useful were the navigation bars for this task?"
 Very useful: 10%
 Somewhat useful: 10%
 Not useful at all: 60%
 Irritating or confusing: 20%
 Representative Comments:

TABLE C-continued

"I never use it, I just use the search engine."
"With them, I just get links after tons of clicks, where I get the same link by doing a search."
"I have no idea where it is pointing me to!"
"What problems did you experience with the look and feel of the site?" (choose all that apply)
  Text too small to read: 10%
  Text too large for the page: 10%
  Text color hard to read: 15%
  Confusing layout: 40%
  Confusing icons: 40%
  Irritating colors: 20%
  Distracting animation: 20%
  Page is too wide for my browser window: 10%
  Representative Comments:
  "Some icons look really like buttons on the page, however, they are just part of a gif of an ad. I feel very misled by this and get more suspicious of other things on the site."
  "The buttons are really small and hard to point to with the touch pack of my laptop."
"Were the pages on this site too long or short?"
  Too long: 5%
  Just right: 80%
  Too short: 15%
  Representative Comments:
  "Not much scroll down is needed, That's okay."
  "Some scroll down is necessary, would actually prefer scrolling to clicking through several shorter pages."
Scroll coverage (average percent of page viewed): 90%
"Was there too much content on each page of this site?"
  Too much content on each page: 50%
  Just enough content on each page: 30%
  Not enough content on each page: 20%
  Representative Comments:
  "I think a lot of pages can be split into multiple pages."
  "It's tiring to read all these long paragraphs, while there is maybe only one line I need."
  "I say you should put them in point form!!"
  Summary:
  Users were mixed on how consistent and pleasing the look and feel of the site was, but this did not seem to affect the quality of their experience very much. Navigation bars were not much use for the average task and irritated a surprising percentage of users. Of the look and feel problems, confusing icons and page layout were the most often cited. Page length was acceptable with excellent scroll coverage, but 50% of users felt there was too much content on each page, perhaps contributing to the confusing layout rating.
B. Structure and Links
Overall:
  Very effective: 20%
  Effective: 50%
  Ineffective: 25%
  Very ineffective: 5%
Average "Back" button hits as % of total page views per task: 16%
"Why did you click the Back button?"
  Link was not what I expected: 60%
  Page too slow to load: 10%
  Link was what I expected but did not have the info I needed: 30%
  Representative Comments:
  "The link is totally not when it says it is."
  "The links are too brief to be understandable, what I can do is just to try and see, then back if it's not it"
  "I would like to see more descriptive links."
Average "Stop" button hits as % of total page views per task: 17%
"Why did you click the Stop button?"
  Link was not what I expected: 10%
  Page too slow to load: 80%
  Link was what I expected but did not have the info I needed: 10%
  Representative Comments:
  "It takes ridiculously long to load some pages."
  "I think there are just too many ads on each page"
  "Is the site down from time to time?"
Average "Go" menu hits as % of total page views per task: 21%[5]
"Why did you click the Go menu?"
  I'm lost: 40% (average length: 10 pages)
  Didn't find my info. -- need to start over: 40% (average length: 6 pages)
  Need to go back and forth to compare info: 20%
  Representative Comments:
  "I was jumping here and there and now I don't know where I am. It'd be great if there was a site map and whenever I hit it, it'll tell me where I am or even where I've been."
  "I used to keep hitting links to see what I'll get from different links, then GO back to a particular point or even the stalling point. It's a lot of trial and error."
Average length of "Go" menu hit: 8 pages[4]
"Do you feel that the structure of this site was too deep or to wide? ("Deep" is a few choices with lots of pages underneath, "Wide" is lots of choices but with fewer pages underneath)"
  Too Deep: 10%
  Just Right: 40%
  Too Wide: 50%
  Representative Comments:
  "There are always too many badly-described links on each page which give me a headache."
  "I feel that I am spending to much time on deciphering the descriptions of some many links which do not care at all."
  "I don't mind doing a lot of clicks, but reading a lot before every hit annoys me."
Average number of links per page encountered: 29
"Is it difficult to choose which link to click on when using this site?" (Asked at the end of the each task)
  Always: 20%
  Sometimes: 70%
  Never: 10%
"Why?" (Choose all that apply)
  Too many choices: 10%
  Choices are not well labeled: 30%
  Too few choices: 10%
  None of the choices seem right for what I want: 40%
  There are two or more possible choices for what I want: 60%
"Is it difficult to choose which link to click on?" (Asked for pages where users stay more than 10 seconds with no action)
  Yes: 70%
  No: 30%
"Why?" (Choose all that apply)
  Too many choices: 20%
  Choices are not well labeled: 20%
  Too few choices: 10%
  None of the choices seem right for what I want: 50%
  There are two or more possible choices for what I want: 80%
"Please rate the way information is categorized on this site."
  Very useful, just how I would expect it: 60%
  Not useful at all, not how I expected it: 40%
  Representative Comments:
  "I think its categories cover pretty much everything."
  "I think the categories are clear and there is not a lot of overlaps between them, which helps a lot."
  "I wish other sports were better covered, like boxing."
  Summary:
  Users rated the structure effective overall, but when asked more specific questions, they cited too many choices on a page and overlapping/non-mutually-exclusive link choices on a given page, making it hard to choose where to go next to find the desired information. This could account for the relatively high rate of "pogo-sticking" on the site due to being lost or at a dead-end. This could also relate to the earlier comments that the interface was confusing to navigate after the first page.
C. Search
Overall:
  Very effective: 5%
  Effective: 35%
  Ineffective: 45%
  Very ineffective: 15%
"Please rate the quality of your search results." (Asked after each search)
  Very relevant: 20%
  Somewhat relevant: 50%
  Not relevant at all: 30%
  Representative Comments:
  "Sometime, some links are out of date and pointing to no where. I think MASKED_SITE need to keep itself more updated, but on the other hand, I do find the information that I need."
  "Usually, within three pages of the search result, I'll find the right link to where I want to go."
  "I think the search result has what I want, but usually, are not sorted very well. Sometimes, there are very irrelevant links on top of the search result, where the relevant ones are at the bottom or even on the next page."

TABLE C-continued

"Yeah, I get what I want, however, the result can be more convenient. For many searches, it takes several tries and refinements to coax the search engine to understand me."

Average number of searches performed for a given task: 3.6
    Least: 0
    Most: 8
Average number of page views between searches: 7
Average time spent between searches (time after results are served and before the next search): 2 min 20 sec
Average number of resets per search:
    Back: 2 (28%)
    Stop: 1 (14%)
    Go: 3 (43%)

"Please rate the comprehensiveness of searching options for this search engine."
    Comprehensive: 95%
    Missing some useful options: 5%
    Missing several useful options: 0%
    Representative Comments:
    "Well, I can't think of anything else that I want and you don't have."
    "You are pretty much the standard by which I judge other search engines."

"Please rate the speed of this search engine."
    Extremely fast: 60%
    Average: 35%
    Extremely slow: 5%
    Representative Comments:
    "Well, it's one of the fastest so far."
    "Even when I put in a complicated search, with like 10 strings, it still doesn't slow down."

Average wait time for a search: 6 sec
    Summary:
    Though search options and speed rated well, the relevance of results returned was mediocre, and the high number of searches performed per task indicates a lack of the desired information on the main site (confirmed by high number of other sites visited per task). Mediocre quality of results also led to high reset rates in between each search.

D. Ads
Overall:
    Very helpful: 5%
    Helpful: 10%
    No effect: 65%
    Hurtful: 15%
    Very hurtful: 5%
    Representative Comments:
    "Other than the load time, I don't feel any affect of the ad"
    "Basically, I do not pay any attention to the ad"
    "They just make the pages more colorful and that's it. They are interesting sometime, I don't even look and find out what they are about."
    "Some of these ads look like part of the site. I'm then very frustrated and feel stupid when I click on something that turns out to be an ad. I totally avoid the ads."

"Which ads do you remember seeing? For what products or companies?"
    IBM: 40%
    Sweepstakes: 80%
    Free email: 20%
    Buying a car: 20%
Average % of ad-bearing pages: 80%
Clickthrough rate: 0.2%
    Summary:
    Ads did not seem to have a material effect on usability. Recall was highest for "sweepstakes" ads and IBM. Low clickthrough rate probably due to task-intensive nature of the session, and points to low helpfulness of ad with respect to the specific task at hand.

E. Content
Overall:
    Very high quality: 10%
    High quality: 30%
    Average: 30%
    Low quality: 25%
    Very low quality: 5%
    Representative Comments:
    "It cover almost everything."
    "Sometimes it links to non-English site, which is really weird to me."
    "As far as I know, it is one of the best, and I usually find what I need in or through the site, even thought it may not be very efficient."

"Are there significant areas of information missing from this site?"
    Yes: 70%
    No: 30%

"What areas of information are missing from this site?"
    Representative Comments:
    "I would have added a boxing section. And horseracing."
    "Only recent info is there. Historical info is totally non-existent."
    "More historical stats, going back a long ways."
    "Where's yachting?"
    Summary:
    Users gave the site mediocre ratings on content quality, citing significant areas of missing information. Further comments point to historical statistics and "non-major" sports as areas to consider adding.

TASK-SPECIFIC ANALYSIS

Most Difficult Tasks
Comments on Task 7:
"There is no link to any of Mike Tyson home page, where I am sure there must be some Mike Tyson home page around."
"The sport sites I was pointed to don't even have a boxing section. I have no idea why I was pointed to them."
"It took me such a long time and so many clicks to finally find a boxing site, but there are only some articles of Tyson's recent fights. I think the search engine should get me to the right statistic page of one of those sport site, instead of just the home pages of all of them and let me find it."
"Forget it, this is ridiculous."

Comments on Task 8:
"The search engine does not like date, nor year. All the results are totally not related to the year."
"MASKED_SITE only points me to those sites, but not to the page in which the information I need is. I mean, I would go to those site myself, why do I need MASKED_SITE??"
"I don't understand why those sport sites don't have this piece of info, 1986 was not too long ago."

Task-level Statistics
Difficulty:
Tasks 7,8,and 3 are the hardest tasks to perform when starting from MASKED_SITE. Tasks 5, 2, and 10 are the easiest.

| Task Number | Success Rate % | Failure Rate % | Give up Rate % |
| --- | --- | --- | --- |
| 7 | 20% | 16% | 64% |
| 8 | 28% | 8% | 64% |
| 3 | 40% | 40% | 20% |
| 6 | 56% | 24% | 20% |
| 9 | 68% | 24% | 8% |
| 1 | 72% | 0% | 28% |
| 4 | 76% | 0% | 24% |
| 5 | 88% | 4% | 8% |
| 2 | 96% | 0% | 4% |
| 10 | 96% | 0% | 4% |
| Average | 64% | 12% | 24% |

Task Duration:
When duration is over 10 minutes or 20 page views for these tasks, high likelihood of failure.

| Task Number | Page Views | Time spent | Time per page |
| --- | --- | --- | --- |
| 8 | 31 | 12:10 | 0:23 |
| 7 | 27 | 11:30 | 0:25 |
| 2 | 11 | 4:30 | 0:24 |
| 9 | 9 | 3:20 | 0:22 |
| 3 | 8 | 3:00 | 0:22 |
| 4 | 8 | 5:00 | 0:37 |
| 1 | 6 | 2:40 | 0:26 |
| 6 | 5 | 1:10 | 0:14 |
| 10 | 4 | 1:00 | 0:15 |

TABLE C-continued

| | | | |
|---|---|---|---|
| 5 | 2 | 0:50 | 0:25 |
| Average | 11.10 | 4:31 | 0:23 |

Subjective Satisfaction Ratings:
Most satisfied with 10, 5, and 6. Least satisfied with 9,8, and 7.

| Task Number | Satisfaction Rating (5 best) |
|---|---|
| 10 | 5 |
| 5 | 5 |
| 6 | 4 |
| 3 | 3 |
| 4 | 3 |
| 1 | 3 |
| 2 | 2 |
| 9 | 2 |
| 8 | 1 |
| 7 | 1 |
| Average | 2.9 |

Site Latency:

| Task Number | % Wait time | Wait time/page |
|---|---|---|
| 6 | 10% | 0:01 |
| 2 | 19% | 0:04 |
| 7 | 19% | 0:04 |
| 8 | 21% | 0:04 |
| 3 | 22% | 0:05 |
| 1 | 25% | 0:06 |
| 4 | 20% | 0:07 |
| 10 | 55% | 0:08 |
| 9 | 38% | 0:08 |
| 5 | 34% | 0:08 |
| Average | 26% | 0:06 |

Misleading links/"StopRequest" behavior:
More stops doesn't necessarily correlate with lower success rate, but seem to reduce satisfaction levels.

| Task Number | Back/total pages | Stop/total pages | Satisfaction Rating (5 best) | Success Rate % |
|---|---|---|---|---|
| 3 | 25% | 25% | 3 | 40% |
| 4 | 25% | 25% | 3 | 76% |
| 9 | 22% | 22% | 2 | 68% |
| 6 | 20% | 20% | 4 | 56% |
| 7 | 19% | 15% | 1 | 20% |
| 2 | 18% | 18% | 2 | 96% |
| 1 | 17% | 33% | 3 | 72% |
| 8 | 13% | 13% | 1 | 28% |
| 10 | 0% | 0% | 5 | 96% |
| 5 | 0% | 0% | 5 | 88% |
| Average | 16% | 17% | 2.9 | 64% |

"Pogo Stick" Behavior
More Gos seem to correlate with less satisfaction.

| Task Number | Go/total pages | Satisfaction Rating (5 best) | Success Rate % |
|---|---|---|---|
| 6 | 40% | 4 | 56% |
| 3 | 38% | 3 | 40% |
| 2 | 27% | 2 | 96% |
| 4 | 25% | 3 | 76% |
| 8 | 23% | 1 | 28% |
| 9 | 22% | 2 | 68% |
| 7 | 19% | 1 | 20% |
| 1 | 17% | 3 | 72% |
| 10 | 0% | 5 | 96% |

TABLE C-continued

| | | | |
|---|---|---|---|
| 5 | 0% | 5 | 88% |
| Average | 21% | 2.9 | 64% |

Search Behavior:
More searches correlates to lower success rate, higher pogo-sticking, and lower satisfaction.

| Task Number | Success Rate % | Number of Searches | Go/total pages | Satisfaction Rating (5 best) |
|---|---|---|---|---|
| 1 | 72% | 0 | 17% | 3 |
| 5 | 88% | 0 | 0% | 5 |
| 2 | 96% | 1 | 27% | 2 |
| 9 | 68% | 1 | 22% | 2 |
| 10 | 96% | 1 | 0% | 5 |
| 4 | 76% | 3 | 25% | 3 |
| 6 | 56% | 4 | 40% | 4 |
| 3 | 40% | 4 | 38% | 3 |
| 7 | 20% | 5 | 19% | 1 |
| 8 | 28% | 7 | 23% | 1 |
| Average | 64% | 2.60 | 21% | 2.9 |

Viewer Retention:
When viewers are sent elsewhere, they succeed about the same percentage of the time, but are less satisfied overall.

| Task Number | Home site/total pages | Success Rate % | Satisfaction Rating (5 best) |
|---|---|---|---|
| 5 | 100% | 88% | 5 |
| 6 | 80% | 56% | 4 |
| 1 | 67% | 72% | 3 |
| 4 | 63% | 76% | 3 |
| 2 | 55% | 96% | 2 |
| 10 | 50% | 96% | 5 |
| 7 | 37% | 20% | 1 |
| 8 | 32% | 28% | 1 |
| 3 | 25% | 40% | 3 |
| 9 | 22% | 68% | 2 |
| Average | 53% | 64% | 2.9 |

CROSS-SITE ANALYSIS

| Top-level Summary Site Name | Success Rate % | Page Views | Number of Searches | % Successes on Home site | Satisfaction Rating (5 best) |
|---|---|---|---|---|---|
| MASKED_SITE | 64% | 11.1 | 2.6 | 42% | 2.9 |
| Yahoo | 86% | 10.2 | 1.5 | 65% | 3.6 |
| Infoseek | 51% | 14.4 | 1.7 | 27% | 2.2 |
| Lycos | 55% | 9.2 | 2.2 | 25% | 2.3 |
| CBS Sportsline | 77% | 8.1 | 1.5 | 100% | 3.9 |
| CNN SI | 40% | 15.5 | 3.5 | 100% | 1.8 |
| ESPN Sportszone | 57% | 10.8 | 1.2 | 100% | 4.2 |
| Average | 61% | 11.34 | 2.0 | 66% | 3.0 |

USER-SPECIFIC ANALYSIS

Most Successful Users:
Most Frustrated Users:
New Users:
Experienced Users:
Gender Differences:
Domain Familiarity:

APPENDIX A: TEST TASKS

1. Which baseball team is Joe Carter playing for?
2. What was Michael Jordan's average points per game in 1996?
3. How many Grand Slam tennis championships has Pete Sampras won?
4. How many times have the Blue Jays won the World Championships?
5. When did the Chicago Bulls last play the NY Knicks?
6. Who was voted Most Valuable Pitcher (i.e. won the Cy Young Award) in 1997?

TABLE C-continued

7. What is the career win-draw-loss record for Mike Tyson?
8. Which two teams were in the Super Bowl in 1986?
9. In which round did the Netherlands lose during the 1990 World Cup?
10. How many times did the Maple Leaves win the Stanley Cup since 1939?

[1]Group Average for the sports-related test topic is comprised of results from: Yahoo, Infoseek, Lycos, AltaVista, CNNSI, SportsCenter and Sports-Zone. All Group Average tests conducted in April–May 1998.
[2]"Failure" is defined as user giving an incorrect answer.
[3]"Give up" is defined as user stopping the test task without giving an answer.
[4]Rated on scale of 1–5, with 5 being the most positive and 1 the most negative.
[5]"Go" menu hits are typically a more severe form of "Back" hit, since they are a shortcut for multiple "Back" hits. A high "Go" rate often belies confusion with site structure and content organization, as users "pogo stick" through the site looking (unsuccessfully) for their desired content. Average length of "Go" menu hit also gives information on the severity of the misleading link that has been chosen by the user.

The following is a discussion various alternative embodiments of the invention.

Data Collection Device and Process

Browser Navigation/Behavior Data
   Capture Locally at the Tester
   Capture browser events through new technology in browser (EventSpy
   Communicator's "Quality Feedback Agent", etc).
   Capture browser events locally through modified browser application
   Capture browser events through browser as modified on the fly (via applets, plug-ins, and helper apps)
   Use history log of browser
   Capture information at the OS, firing of events, access of resources, bare communication channel . . .
   Capture Remotely at Server
   Modify Web sites to be analyzed (use of frames, JavaScript, cgi scripts, cookies, etc)
   Use server logs
   Use info coming in at the raw communication channel
   Capture at Third Party
   Capture communications at a Web proxy
   Applet/Link from a third party server
   Remote server which captures the site to be tested within a frame
Survey Data/Explicit Commentary
   Capture Locally at the Tester
   Capture browser events locally through modified browser application
   Capture browser events through browser as modified on the fly (via applets, plug-ins, helper apps)
   Related applications for audio capture
   Capture Remotely at Server
   Modify Web sites to be analyzed (use of frames, JavaScript, cgi scripts, cookies, etc)
   Communication channel from a remote test manager (human or automated)
   Capture at Third Party
   Applet/Link from a third party server
   Remote server which captures the site to be tested within a frame
Implicit/Subconscious Data
   Capture Locally at the Tester
   Video capture
   Bio-response
   Capture Remotely at Server
   Communication Channel from a remote test manager (human or automated)

Data Transmission

Data collected at the client is typically combined with data from other clients in the analysis. Usually this involves transmission of the data from the client to the server. The data sent may either be in raw form, or summary statistics after processing has been performed at the client. The amount of data may be either very small (on-line transferals of each log entry or response made, e.g.) or much larger scope (the log for an entire test script, or extended period of browser usage). Either the client or server may initiate such transfer. Trigger events may be explicit user actions, time-based, log sized based, in response to a remote message (sent via RPC, e-mail, etc), visiting a particular page of the WWW. A (denigrated) alternative is to manage the data as a distributed database, with each tester client maintaining his or her own information and contributing to the processing of any query that may involve said data. Encryption and compression may be advantageously employed to enhance the security and efficiency of the data transmission step.

Data Collection Device Distribution

Download application via the Web
Download applet via the Web
Download plug-in or helper app via the Web
Distribute magnetic or optical media via mail
E-mail an application, applet, plug-in or helper app
Pre-load/bundle with computer purchase
Pre-load/bundle with delivery of other software (browser, OS . . . )

Test Script Device

The test script is a way to guide the tester to exercise certain parts of the Web site or application. It also specifies what questions are to be asked, under what conditions. There are two essential tradeoffs to be made: whether processing takes place at the client or the server, and whether the test is pre-computed or constructed dynamically. Both of these tradeoffs exhibit a spectrum of possible solutions. Some of the sample options within this space are: 1) A powerful, expressive general programming language that is interpreted at the client. Under this formulation, the test script device is a program that is "executed" within the testing device at the client. 2) A "Universal Plan" (in the style of Schoppers AI planning work): For each possible test state, a next question has been pre-calculated. The whole plan comprises the test script device, and may be represented as a table, a tree, or other data structure. 3) A limited programming language. In this style, the test script device is also an executable program, but its capabilities are limited to the common operations of the domain. The architectural design document (Table A) describes one such limited programming language based on triggers in more detail. 4) A simple "question/response" pairing. Under this formulation, the entire test is generated dynamically. The client sees only one question at a time, and sends a response to that question. All calculation about which question to ask next is carried out at the server (perhaps based on one of the techniques described earlier). 5) Hybrid approaches combine some simple question/response pairs with a more powerful dynamic generation technique, along with guidelines about when to use each technique.

Test Script Construction

The test script construction generally requires knowledge:
   1) Of the site being tested (what objectives to set, what questions to ask, what possible answers to offer, what types of testers should be recruited); and 2) Of the testing techniques (format of the question, useful questions that enhance analysis, size of test population, length of test, etc).

The test script construction process may be a collaboration between two or more people that together have the necessary expertise. It is also possible, however, to provide the expertise detailed above in "intelligent" tools that help construct the test scripts. One such tool is a simple editor that provides forms to fill in basic data and translates those forms into a full test script, perhaps adding common recurring questions from a standard template. Other tools may assist in the script construction by surfing the site to be tested and automatically collecting relevant domain questions. Server logs and the like may be used as an additional input to the tool to help construct the test.

The mechanisms to provide the collaboration between people (possibly assisted by tools) are diverse: a stand-alone application, a Web-based application or applet, macros in a word processor, a "group ware" application, voice-based systems such as IVR, along with the full range of technologies to allow the collaborators to communicate with each other.

Test Script Distribution

Test scripts need to be available to the tester client. They may be distributed by:

- Download test script via the Web (either as a separate resource or embedded within a larger resource)
- Distribute magnetic or optical media via mail
- Physical tokens that contain the information (bar code, magnetic token, etc)

Raw Results Data Management

The collected data are useful in a variety of ways, so it is advantageous to store the raw data for subsequent analysis. Any type of database (relational, object, multi-dimensional, for example) can be employed for storing the raw data. Access to the raw data may be granted over a computer network, or the data file may be distributed in ways similar to those described for data collection device distribution. As noted above, it is also possible to permit each tester to maintain control over his own data, treating the population as a distributed data base.

Data Analysis Tools

In order to extract the most value from the collected data, it is typically necessary to perform additional analysis. This analysis may include simple aggregation (sums and averages, for example), selection (production of a subsample) of "typical" data, finding outliers and either excluding them or focusing on them, measuring correlations between data factors, measuring the confidence in a hypothesis. Results from such queries may be presented in tabular or graphical format. Subsamples of the data can also be textual, audio, or video.

The tools to perform this analysis can either be custom crafted to specialize in this domain, or they can be general purpose database and statistical analysis tools, perhaps enhanced with "stored procedures" crafted for the domain.

Distribution of Analyzed Data

Analyzed data may be distributed in the same ways as raw data, but additional alternatives are now advantageous. Hardcopy reports (delivered via mail or fax) are practical when the length is short. Publication of results on a web site, in a periodical, or other press release is appropriate for certain types of analyzed data. In other cases, interactivity is a key aspect of the data usage, so posting to a web site, or distribution of data files in machine readable form (via e-mail, ftp, http, or mailed magnetic or optical media) is more appropriate.

Tester Recruitment/Sample Selection

The selection of testers to participate in a test can greatly affect its outcome. Often, the owner of the site to be tested, or the company that has commissioned the test composes the makeup of the desired test panel. The description of the test, as well as the places in which it is publicized determines respondents. Some options are: publication of the test at a well known depository for multiple tests (e.g. the Facilitas Web site), e-mail distribution, a link or ad on the site to be tested, a link or ad on a separate site that targets the demographics of the desired tester sample, direct mail, inserts into certain physical products. In all of these cases, additional qualifying questions may be asked before the test begins to ascertain that the tester meets the desired characteristics. In some cases, the ability to meet these characteristics may be proven through digital certificates, references, or physical documentation such as a driver's license or passport.

Additional tools may assist with the selection of an appropriate sample size, as well as providing an estimate as to how long it may take to recruit a test panel exhibiting the desired characteristics.

Test Quality Auditing

Given the "remote" nature of the testing, in most cases, there is not any direct observation of the tester during the test. Therefore, additional techniques may be employed to ensure that the tester is taking the test with his "best effort". Some may be statistical techniques to see that adequate progress is being made (in terms of the number of pages visited, e.g.) some may be "pop questions" that ask trivial questions (3+5=?) but require an answer within 5–10 seconds. Other techniques may encourage testers to leave more comments when they have not done so for some time. A post hoc analysis of the test (which may be automated) may result in a test being excluded from consideration in the results.

The following shows a preferred embodiment of two core products of the full-service bureau and test center, according to the invention.

Network Tests: These are tests specified by customers and managed through the Facilitas Test Center. Results are made available in raw data or via a Web-based OLAP-style data mining tool, specifically designed for reporting on and analyzing usability and Feature Quality™ testing data. This is useful for the reasons outlined in the business plan.

Industry Reports: These are based on sponsored tests against the top players in a specific industry segment. Industry Reports analyze the relative Usability and Feature Quality™ of each player against a standard set of user tasks relevant to that industry segment. Industry Reports are published and distributed to customers on a subscription basis.

A sampling of the industry segments to be covered follows:

Search Engines (several categories)
Shopping (several categories)
Publications (several categories)
Travel
Regional
Yellow Pages/Directory
Chat/Community
Brokerage
Online Banking
Finance and Investing
Calendaring/Scheduling
Gaming
Groupware
Human Resources/Accounting
Auction
Adult
Kids
Personal
Classifieds
Sports
Email
Customer Service The following is a discussion of multiple of embodiments of additional full-service bureau and test center products, according to the invention.

1) Expanding the test product suite to support the entire product development cycle. The full product development cycle typically requires different types of user input for each phase:
    a) Planning: Requirements gathering is the main activity here. Facilitas Industry Report is most effective at revealing the strengths and weaknesses of the customer's product against competitors, and helps in generating an initial list of next-generation product requirements.
    b) Design: Research to fully understand the user's mental model in a given domain is useful here. Products to support "card sort" tests and other such exercises can be built into the Facilitas testing suite
    c) Development: Testing of whole features is most prevalent here, as developers build subsystems of the full product, and need to test them part-way through to make sure they are going in the right direction. Products to support testing of specific features and semi-functional prototypes can be built into the Facilitas testing suite.
    d) QA/External Beta: Testing of how the product helps or hinders users who are trying to solve whole problems is critical here (i.e. Feature Quality™). Facilitas Network Test is targeted at this phase
    e) Post-launch: Facilitas Industry Report can be performed again here, to measure the relative improvement of the product as measured against the same set of competitors tested in the Planning Phase.
2) Richer data collection on the tester side via enhancements to the test browser:
    a) Audio/Video recording of individual user test sessions
    b) Voice-to-text conversion of user comments.
    c) Full test replay module, so the test analyst can pick certain test sessions and replay exactly what happened at certain points.
    d) Natural-language processing module to filter tester comments and pick out "representative" comments.
    e) Bio-electrical impulse/brainwave data capture and recording for monitoring of non-verbal, non-visual reactions to content being tested
3) Aggregated test results database of all Facilitas-sponsored tests, so that customers have a reference data set to benchmark their sites' performance against various categories, of Web sites, not necessarily those of their competitors.
4) Real-time reporting of test results, as they happen. This is accomplished by retrieving data from tester browsers on a more frequent, "click-by-click" basis, and processing and reporting on this information immediately.
5) Integration with personalization tools, Web authoring tools, and other such "Web creation and control" systems, which allow developers to make specific design or personalization response decisions, and track how each automated response and design decision leads to changes in Usability and Feature Quality™ of the site. This combination therefore becomes a fine-grained, efficient tuning system for any type of advanced personalization or dynamic content management system. For instance, if a new algorithm leads to a 5% increase in the purchase rate from Website visitors, then a Facilitas test is able to discern if the rise was due to more relevant products being displayed to the user, better navigational cues, a better feeling of security and credibility of the site in the eyes of the user, clearer statement of warranty terms, or lower price.
6) Expanded testing capabilities to cover non-browser clients like email, media players, personal digital assistants, palmtop computers, cellular phones, automobile personal computers and distributed enterprise applications.
7) Longer-timeframe usability testing to enable "customer relationship quality" testing of a Web site's services and support capabilities, via a Facilitas testing browser installed and used on the tester's computer for an extended period of time, with or without following a predetermined test script.
8) A proprietary composite index for measuring the overall quality of any Website tested using the Facilitas testing solution, and using the data generated thereof. The composite index is composed of test performance metrics such as, but not limited to, percent of testers who completed a task successfully, length of visit (in time and pages viewed) taken to complete the task successfully, percent of testers who gave up on a task, percent of testers who completed a task unsuccessfully (i.e. gave the wrong answer or did not fully perform the action requested), and satisfaction ratings given by testers on the Web site's quality, speed, security, comprehensiveness, product selection, product price, visual appeal, accessibility, as well as the testers' own inclination to return to the site on their own and use it for their own objectives and information needs.
9) A proprietary composite index for measuring the overall quality of the portfolio work of any Web design and development firm, via a composite index composed using the composite index in #8 above, calculated across the Websites of all or part of a Web design and development firm's current or past Web development client base.

Although the invention is described herein with reference to variety of preferred embodiments, one skilled in the art will readily appreciate that other applications may be substituted for those set forth herein without departing from the spirit and scope of the present invention. Accordingly, the invention should only be limited by the claims included below.

What is claimed is:

1. A method of testing the usability and feature quality of a World Wide Web site, comprising the steps of:

providing a first proprietary software, said first proprietary software comprising a usability and feature quality test comprising a set of specific, predefined objectives to be achieved by a tester in connection with World Wide Web sites to which no additional HTML is added, and which may be independently selected by the tester while completing said objective, where said tester performs actions necessary to achieve said objectives in a manner chosen by the said tester in connection with said tester selected World Wide Web sites;

providing a second proprietary software to administer said usability and feature quality test to a plurality of pre-qualified testers within a specified sample population that comprises individuals who are selected specifically for purposes of taking said test;

providing a storing and retrieval means to store and retrieve data resulting from said administered usability and feature quality test; and providing a World Wide Web based architecture, wherein said first proprietary software comprises a modified browser and/or software working in conjunction with a browser;

whereby said stored data are aggregatable across a plurality of pre-qualified testers and usable in a future analysis associated with said set of specific, predefined objectives.

2. The full-service research bureau and test center method of claim 1, wherein said software working in conjunction with a browser comprises any of, but not limited to a plug-in, a browser helper object, an applet, and a proxy.

3. The full-service research bureau and test center method of claim 2, wherein said modified browser is downloaded and installed on a personal machine of said pre-qualified tester.

4. The full-service research bureau and test center method of claim 2, wherein said modified browser is adapted to collect a plurality of browser events and to transmit said browser events to said second proprietary software.

5. The full-service research bureau and test center method of claim 4, wherein said plurality of browser events comprises any of:

a submission of a page request;

a fulfillment of a page request;

use of a back, forward, home, or stop button;

access of a page from a history or bookmark list;

use of browser functions, including any of adding a bookmark searching for a text string, or viewing HTML source;

a page-scrolling event; and a mouse-over event.

6. The full-service research bureau and test center method of claim 4, wherein said transmitted browser events are in a log form.

7. The full-service research bureau and test center method of claim 2, wherein said modified browser is adapted to pose a question to said pre-qualified tester, said question associated with a browser event from said plurality of browser events, and to transmit a response to said question to said second proprietary software.

8. The full-service research bureau and test center method of claim 2, wherein said modified browser is adapted to pose a question to said pre-qualified tester, said question associated with a message from said second proprietary software and to transmit a response to said message to said second proprietary software.

9. The full-service research bureau and test center method of claim 2, wherein modified browser comprises:

a plurality of additional buttons, any of said additional buttons used by said pre-qualified tester to provide comments or interact with either of a human or automated test moderator; and wherein said modified browser is adapted to transmit said comments to said second proprietary software.

10. The full-service research bureau and test center method of claim 2, further comprising the step of:

loading a World Wide Web page directly from a host server, and wherein said modified browser is adapted to display said World Wide Web page without adding additional Hyper-Text Markup Language (HTML), conveying an appearance and a latency as displayed by a non-modified browser.

11. The full-service research bureau and test center method of claim 1, wherein said second proprietary software is a server application, said server application adapted to support a plurality of usability test sessions, any of said sessions used simultaneously by any of said plurality of pre-qualified testers.

12. The full-service research bureau and test center method of claim 1, wherein said usability test comprises a series of questions, said series of questions representing all or a part of said set of customer objectives.

13. The full-service research bureau and test center method of claim 12, further comprising the step of:

providing an additional question associated with a specific answer to one of said series of questions or associated with particular actions taken during the usability test session.

14. The full-service research bureau and test center method of claim 1, wherein said storing and retrieving means further comprises the step of:

providing a data warehouse comprising a plurality of entries, wherein each entry of said plurality of entries is tagged with a test sequence indicator and a pre-qualified tester identifier, such that said storing and retrieval means is responsive to a complex query.

15. The full-service research bureau and test center method of claim 14, further comprising the step of:

providing a set of queried data from said complex query, wherein said queried data is associated with a predetermined set of demographic properties.

16. The full-service research bureau and test center method of claim 14, further comprising the step of:

providing a set of queried data from said complex query, wherein said queried data is associated with a predetermined set of test-specific properties.

17. The full-service research bureau and test center method of claim 1, further comprising any of the steps of:

providing a test building means, which said customer uses to create and initiate said usability test;

providing a reporter means, which said customer uses to submit a set of queries to said storing and retrieval means and, thereby to obtain an ad hoc report;

providing a report builder, whereby said report builder is adapted to process all or a part of said stored data to provide analysis of said all or a part of said stored data;

providing a World Wide Web site, whereby said World Wide Web site is adapted to facilitate communication between said customers and said testers; and providing a test auditor, whereby a predetermined standard of quality of said data is assured.

18. The full-service research bureau and test center method of claim 17, wherein said test building means is automatic; and further comprising the step of:

providing a specifying means, whereby said customer can specify any of:
a predetermined number of said plurality of testers;
a desired demographic cross-section;
said set of customer objectives; and
other questions.

19. The full-service research bureau and test center method of claim 17, wherein said reporter means comprises a World Wide Web application.

20. The full-service research bureau and test center method of claim 17, wherein said reporter means provides interactive interpretive activities.

21. The full-service research bureau and test center method of claim 17, wherein said report builder is adapted to assist in highlighting substantially relevant quotes and statistics.

22. The full-service research bureau and test center method of claim 17, wherein said report builder is adapted to provide an automated personalized report.

23. The full-service research bureau and test center method of claim 17, further comprising any of the steps of:

providing a customer educating means on said World Wide Web site for said customer to learn about benefits of said usability test;

providing a tester educating means on said World Wide Web site for said tester to learn about said benefits of said usability test;

providing an enrolling means for said tester on said World Wide Web site;

providing an access means for said customer on World Wide Web site to access any of:
a pre-generated report;
said ad hoc report; and
said test builder means;

creating a plurality of communities on said World Wide Web site for all or a portion of said plurality of testers and a plurality of customers; and providing a means for managing a plurality of electronic commercial (e-commerce) transactions.

24. The full-service research bureau and test center method of claim 17, further comprising the step of:

coupling said test auditor to said second proprietary software, and wherein said test auditor is adapted to measure an amount of effort spent by said tester on a task of said usability test and an amount of time spent by said tester on said task of said usability test.

25. The full-service research bureau and test center method of claim 17, wherein said test auditor provides a bonus to said tester, said tester having provided a substantially high quality response.

26. An apparatus for testing the usability and feature quality of a World Wide Web site, comprising:

a first proprietary software, said first proprietary software comprising a usability and feature quality test; comprising a set of specific, predefined objectives to be achieved by a tester in connection with World Wide Web sites to which no additional HTML is added, and which may be independently selected by the tester while completing said objective, where said tester performs actions necessary to achieve said objectives in a manner chosen by said tester in connection with said tester selected World Wide Web sites;

a second proprietary software to administer said usability and feature quality test to a plurality of pre-qualified testers within a specified sample population that comprises individuals who are selected specifically for purposes of taking the test;

a storing and retrieval means to store and retrieve data resulting from said administered usability and feature quality test; and a World Wide Web based architecture, wherein said first proprietary software comprises a modified browser and/or software working in conjunction with a browser;

whereby said stored data are aggregatable across a plurality of pre-qualified testers and usable in a future analysis associated with said set of specific, predefined objectives.

27. The full-service research bureau and test center apparatus of claim 26, wherein said software working in conjunction with a browser comprises any of, but not limited to a plug-in, a browser helper object, an applet, and a proxy.

28. The full-service research bureau and test center apparatus of claim 27, wherein said modified browser is downloaded and installed on a personal machine of said pre-qualified tester.

29. The full-service research bureau and test center apparatus of claim 27, wherein said modified browser is adapted to collect a plurality of browser events and to transmit said browser events to said second proprietary software.

30. The full-service research bureau and test center apparatus of claim 29, wherein said plurality of browser events comprises any of:

a submission of a page request;
a fulfillment of a page request;
use of a back, forward, home, or stop button;
access of a page from a history or bookmark list;
use of browser functions, including any of adding a bookmark, searching for a text string, or viewing HTML source;
a page-scrolling event; and
a mouse-over event.

31. The full-service research bureau and test center apparatus of claim 29, wherein said transmitted browser events are in a log form.

32. The full-service research bureau and test center apparatus of claim 27, wherein said modified browser is adapted to pose a question to said pre-qualified tester, said question associated with a browser event from said plurality of browser events, and to transmit a response to said question to said second proprietary software.

33. The full-service research bureau and test center apparatus of claim 27, wherein said modified browser is adapted to pose a question to said pre-qualified tester, said question associated with a message from said second proprietary software and to transmit a response to said message to said second proprietary software.

34. The full-service research bureau and test center apparatus of claim 27, wherein modified browser comprises:

a plurality of additional buttons, any of said additional buttons used by said pre-qualified tester to provide comments or interact with either a human or automated test moderator; and wherein said modified browser is adapted to transmit said comments to said second proprietary software.

35. The full-service research bureau and test center apparatus of claim 27, further comprising:

a World Wide Web page, said World Wide Web page loaded directly from a host server, and wherein said modified browser is adapted to display said World Wide Web page without adding additional Hyper-Text Markup Language (HTML), conveying an appearance and a latency as displayed by a non-modified browser.

36. The full-service research bureau and test center apparatus of claim 26, wherein said second proprietary software is a server application, said server application adapted to support a plurality of usability test sessions, any of said sessions used simultaneously by any of said plurality of pre-qualified testers.

37. The full-service research bureau and test center apparatus of claim 26, wherein said usability test comprises a series of questions, said series of questions representing all or a part of said set of customer objectives.

38. The full-service research bureau and test center apparatus of claim 37, further comprising:

an additional question associated with a specific answer to one of said series of questions or associated with particular actions taken during the usability test session.

39. The full-service research bureau and test center apparatus of claim 26, wherein said storing and retrieving means further comprises:

a data warehouse comprising a plurality of entries, wherein each entry of said plurality of entries is tagged with a test sequence indicator and a pre-qualified tester identifier, such that said storing and retrieval means is responsive to a complex query.

40. The full-service research bureau and test center apparatus of claim 39, further comprising:

a set of queried data from said complex query, wherein said queried data is associated with a predetermined set of demographic properties.

41. The full-service research bureau and test center apparatus of claim 39, further comprising:

a set of queried data from said complex query, wherein said queried data is associated with a predetermined set of test-specific properties.

42. The full-service research bureau and test center apparatus of claim 26, further comprising any of:

a test building means, which said customer uses to create and initiate said usability test;

a reporter means, which said customer uses to submit a set of queries to said storing and retrieval means and, thereby to obtain an ad hoc report;

a report builder, whereby said report builder is adapted to process all or a part of said stored data to provide analysis of said all or a part of said stored data;

a World Wide Web site, whereby said World Wide Web site is adapted to facilitate communication between said customers and said testers; and a test auditor, whereby a predetermined standard of quality of said data is assured.

43. The full-service research bureau and test center apparatus of claim 42, wherein said test building means is automatic; and further comprising:

a specifying means, whereby said customer can specify any of:

a predetermined number of said plurality of testers;
a desired demographic cross-section;
said set of customer objectives; and
other questions.

44. The full-service research bureau and test center apparatus of claim 42, wherein said reporter means comprises a World Wide Web application.

45. The full-service research bureau and test center apparatus of claim 42, wherein said reporter means provides interactive interpretive activities.

46. The full-service research bureau and test center apparatus of claim 42, wherein said report builder is adapted to assist in highlighting substantially relevant quotes and statistics.

47. The full-service research bureau and test center apparatus of claim 42, wherein said report builder is adapted to provide an automated personalized report.

48. The full-service research bureau and test center apparatus of claim 42, further comprising any of:

a customer educating means on said World Wide Web site for said customer to learn about benefits of said usability test;

a tester educating means on said World Wide Web site for said tester to learn about said benefits of said usability test;

an enrolling means for said tester on said World Wide Web site;

an access means for said customer on World Wide Web site to access any of:
a pre-generated report;
said ad hoc report; and
said test builder means;

a plurality of communities on said World Wide Web site for all or a portion of said plurality of testers and a plurality of customers; and a means for managing a plurality of electronic commercial (e-commerce) transactions.

49. The full-service research bureau and test center apparatus of claim 42, wherein said test auditor is coupled to said second proprietary software, and wherein said test auditor is adapted to measure an amount of effort spent by said tester on a task of said usability test and an amount of time spent by said tester on said task of said usability test.

50. The full-service research bureau and test center apparatus of claim 42, wherein said test auditor provides a bonus to said tester, said tester having provided a substantially high quality response.

51. A method of testing the usability and feature quality of a World Wide Web site, comprising the steps of:

providing any of, but not limited to a modified browser, software working in conjunction with a browser, a plug-in, a browser helper object, an applet, and a proxy;

logging onto a full-service research bureau and test center;

designing a test script for a test site comprising a set of specific, predefined objectives to be achieved by a tester in connection with World Wide Web sites to which no additional HTML is added, and which may be independently selected by the tester while completing said objective, where said tester performs actions necessary to achieve said objectives in a manner chosen by said tester in connection with said tester selected World Wide Web sites;

defining a composition of a desired test panel;

defining requirements for a test completion date;

authorizing a test run;

retrieving raw test result data;

analyzing raw test result data;

optionally comparing analyzed test result data with at least a second analyzed test result data of a second test run by a second tester;

wherein said second tester is different from said tester;

optionally retrieving an industry report on a plurality of comparative test runs across an industry segment; and optionally building at least one report for delivery to a stakeholder in said test site.

52. The method of claim 51, further, comprising the steps of:

logging onto said full-service research bureau and test center;

registering to become a paid tester;

downloading a tester client modified browser and/or software working in conjunction with a browser;

searching for a new usability test session; and optionally checking a personal account for a payment status and to manage a personal profile.

53. The full-service research bureau and test center method of claim 52, wherein said software working in conjunction with a browser comprises any of, but not limited to a plug-in, a browser helper object, an applet, and a proxy.

\* \* \* \* \*